United States Patent
Young et al.

(10) Patent No.: US 10,942,564 B2
(45) Date of Patent: Mar. 9, 2021

(54) DYNAMIC GRAPHICS RENDERING BASED ON PREDICTED SACCADE LANDING POINT

(71) Applicant: Sony Interactive Entertainment Inc., Tokyo (JP)

(72) Inventors: Andrew Young, San Mateo, CA (US); Javier Fernandez Rico, Pacifica, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 229 days.

(21) Appl. No.: 15/982,275

(22) Filed: May 17, 2018

(65) Prior Publication Data

US 2019/0354173 A1 Nov. 21, 2019

(51) Int. Cl.
  *G06F 3/01* (2006.01)
  *G02B 27/00* (2006.01)
  *G06F 1/3231* (2019.01)
  *G06N 3/04* (2006.01)

(52) U.S. Cl.
  CPC .......... *G06F 3/013* (2013.01); *G02B 27/0093* (2013.01); *G06F 1/3231* (2013.01); *G06F 3/015* (2013.01); *G06N 3/04* (2013.01)

(58) Field of Classification Search
  None
  See application file for complete search history.

(56) References Cited

U.S. PATENT DOCUMENTS

| | | | |
|---|---|---|---|
| 5,726,916 A * | 3/1998 | Smyth | A61B 5/0496 351/210 |
| 6,120,461 A | 9/2000 | Smyth | |
| 7,783,061 B2 | 8/2010 | Zalewski et al. | |
| 7,809,145 B2 | 10/2010 | Mao | |
| 8,786,698 B2 | 7/2014 | Chen et al. | |
| 8,793,620 B2 | 7/2014 | Stafford | |
| 8,824,779 B1 | 9/2014 | Smyth | |
| 8,854,298 B2 | 10/2014 | Osman et al. | |
| 8,907,891 B2 | 12/2014 | Zhu et al. | |
| 9,030,425 B2 | 5/2015 | Stafford | |
| 9,044,675 B2 | 6/2015 | Stafford et al. | |
| 9,084,938 B2 | 7/2015 | Osman et al. | |
| 9,183,683 B2 | 11/2015 | Osman et al. | |
| 9,652,882 B2 | 5/2017 | Cerny | |
| 9,665,171 B1 | 5/2017 | Skogo et al. | |

(Continued)

OTHER PUBLICATIONS

"3D Face Pose Estimation from a Monocular Camera" by Qiang Ji and Ruong Hu in Image and Vision Computing, vol. 20, Issue 7, Feb. 20, 2002, pp. 499-511.

(Continued)

*Primary Examiner* — Duane N Taylor, Jr.
(74) *Attorney, Agent, or Firm* — Penilla IP, APC

(57) ABSTRACT

A method for predicting eye movement in a head mounted display (HMD). The method including tracking movement of an eye of a user with a gaze tracking system disposed in the HMD at a plurality of sample points. The method including determining velocity of the movement based on the movement of the eye. The method including determining that the eye of the user is in a saccade upon the velocity reaching a threshold velocity. The method including predicting a landing point on the display of the HMD corresponding to a direction of the eye for the saccade.

31 Claims, 19 Drawing Sheets

(56) References Cited

U.S. PATENT DOCUMENTS

| | | | |
|---|---|---|---|
| 9,857,871 | B2 | 1/2018 | Mallinson |
| 2004/0207632 | A1 | 10/2004 | Miller et al. |
| 2006/0239471 | A1 | 10/2006 | Mao et al. |
| 2007/0171367 | A1 | 7/2007 | Sebastian et al. |
| 2008/0188777 | A1 | 8/2008 | Bedziouk et al. |
| 2009/0289895 | A1 | 11/2009 | Nakada et al. |
| 2010/0056274 | A1 | 3/2010 | Uusitalo et al. |
| 2011/0085700 | A1 | 4/2011 | Lee |
| 2011/0298829 | A1 | 12/2011 | Stafford et al. |
| 2012/0052954 | A1 | 3/2012 | Zhu et al. |
| 2012/0068913 | A1 | 3/2012 | Bar-Zeev |
| 2012/0075062 | A1 | 3/2012 | Osman et al. |
| 2012/0086630 | A1 | 4/2012 | Zhu et al. |
| 2012/0086631 | A1 | 4/2012 | Osman et al. |
| 2012/0122592 | A1 | 5/2012 | Stafford et al. |
| 2012/0154277 | A1 | 6/2012 | Bar-Zeev et al. |
| 2012/0272179 | A1 | 10/2012 | Stafford |
| 2012/0276998 | A1 | 11/2012 | Zhu et al. |
| 2012/0300061 | A1 | 11/2012 | Osman et al. |
| 2013/0050432 | A1 | 2/2013 | Perez et al. |
| 2013/0127980 | A1 | 5/2013 | Haddick et al. |
| 2013/0135196 | A1 | 5/2013 | Park et al. |
| 2013/0257751 | A1 | 10/2013 | Stafford |
| 2013/0279724 | A1 | 10/2013 | Stafford et al. |
| 2014/0013437 | A1 | 1/2014 | Anderson et al. |
| 2014/0036197 | A1 | 2/2014 | Furusho |
| 2014/0092006 | A1 | 4/2014 | Boelter et al. |
| 2014/0247277 | A1 | 9/2014 | Guenter et al. |
| 2014/0313120 | A1 | 10/2014 | Kamhi |
| 2014/0333535 | A1 | 11/2014 | Stafford |
| 2014/0361971 | A1 | 12/2014 | Sala |
| 2014/0361976 | A1 | 12/2014 | Osman et al. |
| 2014/0361977 | A1 | 12/2014 | Stafford et al. |
| 2014/0362110 | A1 | 12/2014 | Stafford |
| 2015/0015486 | A1 | 1/2015 | Osman et al. |
| 2015/0085097 | A1 | 3/2015 | Larsen |
| 2015/0085250 | A1 | 3/2015 | Larsen |
| 2015/0085251 | A1 | 3/2015 | Larsen |
| 2015/0094142 | A1 | 4/2015 | Stafford |
| 2015/0169053 | A1 | 6/2015 | Bozarth et al. |
| 2015/0192776 | A1 | 7/2015 | Lee et al. |
| 2015/0213634 | A1 | 7/2015 | Karmarkar et al. |
| 2015/0258431 | A1 | 9/2015 | Stafford et al. |
| 2015/0258432 | A1 | 9/2015 | Stafford et al. |
| 2015/0287167 | A1 | 10/2015 | Cerny |
| 2015/0338915 | A1* | 11/2015 | Publicover ......... H04N 5/44504 345/633 |
| 2016/0025971 | A1 | 1/2016 | Crow et al. |
| 2016/0054837 | A1 | 2/2016 | Stafford |
| 2016/0085302 | A1 | 3/2016 | Publicover et al. |
| 2016/0091720 | A1 | 3/2016 | Stafford et al. |
| 2016/0093105 | A1 | 3/2016 | Rimon et al. |
| 2016/0116745 | A1 | 4/2016 | Osterhout et al. |
| 2017/0090562 | A1 | 3/2017 | Gustafsson et al. |
| 2017/0123489 | A1 | 5/2017 | Guenter |
| 2017/0124760 | A1 | 5/2017 | Murakawa et al. |
| 2017/0285735 | A1 | 10/2017 | Young et al. |
| 2017/0285736 | A1 | 10/2017 | Young et al. |
| 2017/0287112 | A1 | 10/2017 | Stafford et al. |
| 2017/0287446 | A1 | 10/2017 | Young et al. |
| 2018/0008141 | A1 | 1/2018 | Krueger |

OTHER PUBLICATIONS

An algorithm for Real-time Stereo Vision Implementation of Head Pose and Gaze Direction Measurement:, by Yoshio Matsumoto and Alexander Zelinsky in FG '00 Proceedings of the Fourth IEEE International Conference on Automatic Face and Gesture Recognition, 2000, pp. 499-505.

"Facial feature extraction and pose determination", by Athanasios Nikolaidis Pattern Recognition, vol. 33 (Jul. 7, 2000) pp. 1783-1791.

"Head Pose Estimation in Computer Vision: A Survey" by Erik Murphy in IEEE Transactions on Pattern Analysis and Machine Intelligence, vol. 31, No. 4, Apr. 2009, pp. 607-626.

Non-Final Office Action for U.S. Appl. No. 15/086,645, dated Oct. 11, 2017.

Non-Final Office Action for U.S. Appl. No. 15/086,953, dated Oct. 19, 2017.

Non-Final Office Action for U.S. Appl. No. 15/087,629, dated Feb. 23, 2017.

Non-Final Office Action for U.S. Appl. No. 15/087,629, dated Nov. 15, 2017.

Non-Final Office Action for U.S. Appl. No. 15/087,629, dated Jul. 27, 2017.

Non-Final Office Action for U.S. Appl. No. 15/087,471, dated Oct. 10, 2017.

Non-Final Office Action for U.S. Appl. No. 14/845,862, dated Apr. 20, 2017.

Pagel, Max. "Trajectory-based prediction of saccade landing Points," Bachelorarbeit am Institut für Neuro- und Bioinformatik Technisch Naturwissenschaftliche Fakultat Universität zu Lübeck (2007).

Jochen Triesch, Brian T. Sullivan, Mary M. Hayhoe, Dana H. Ballard. "Saccade Contingent Updating in Virtual Reality." Proceedings of the symposium on Eye tracking research & application— ETRA '02 (2002): n. pag. Web.

Bahill, A. Terry, and Jeffrey S. Kallman. "Predicting Final Eye Position Halfway Through a Saccade." IEEE Transactions on Biomedical Engineering BME-30. 12 (1983): 781-786. Web.

Han, P., D.R. Saunders, R.L. Woods and G. Luo. "Trajectory prediction of saccadic eye movements using a compressed exponential model." Journal of Vision 13.8 (2013): 27. Web.

Martin Böhme, Christopher Krause, Erhardt Barth, and Thomas Martinetz. "Eye Movement Predictions Enhanced by Saccade Detection" Brain Inspired Cognitive Systems: Aug. 29-Sep. 1, 2004. Web.

Wikipedia; "Eye tracking," https://en.wikipedia.org/wiki/Eye_tracking, printed on Feb. 26, 2016, pp. 1-8.

Wikipedia; "Optical flow," https://en.wikipedia.org/wiki/Optical_flow_sensor, printed on Feb. 26, 2016, pp. 1-4.

Wikipedia, "Saccade," https://en.wikipedia.org/wiki.Saccades, printed on Feb. 26, 2016, pp. 1-5.

Patentcooperation Treaty; International Search Report: issued in corresponding PCT Application No. PCT/US16/48736 dated Oct. 28, 2016, 2 pages [134548-PC].

Patentcooperation Treaty; "Notification Of Transmittal Of The International Search Report And The Written Opinion Of The International Searching Authority, Or The Declaration" issued in corresponding PCT Application No. PCT/US16/48736 dated Oct. 28, 2016, 2 pages [134548-PC].

Patentcooperation Treaty; "Written Opinion Of The International Searching Authority" issued in corresponding PCT Application No. PCT/US16/48736 dated Oct. 28, 2016, 8 pages [134548-PC].

Eich, Martine_PCT Notification of Transmittal of the International Search Report and the Written Opinion of the International Searching Authority, or the Declaration_ISA220_ISA210_ISA237_PCT/US2019/031211_ dated Sep. 24, 2019_21 pages.

Patent Cooperation Treaty; Zeiselmair, Sabine Invitation to Pay Additional Fees and, Where Applicable, Protest Fee _ Annex to Form PCT/ISA/206 Communication Relating to the Results of the Partial International Search _ Provisional Opinion EPO Form 1707_PCT/US2019/031211 dated Jul. 30, 2019, 18 pages.

Intl. Prelim Report & Written Opinion, PCT/US2019/031211, dated Nov. 17, 2020, 14 pages.

* cited by examiner

600D

| Window | Sample Points | Predicted Saccade End Direction (from fixation point A) | Predicted Saccade End Time/Frame (from fixation point A) |
|---|---|---|---|
| 661 | 662 | 663 | 664 |
| w1 | $s_2, s_3, s_4, s_5$ | $\vec{X}_{F-5}$ (42°) | $t_{38}$ / F-38 |
| w2 | $s_3, s_4, s_5, s_6$ | $\vec{X}_{F-6}$ (18°) | $t_{20}$ / F-20 |
| w3 | $s_4, s_5, s_6, s_7$ | $\vec{X}_{F-7}$ (28°) | $t_{25}$ / F-25 |
| w4 | $s_5, s_6, s_7, s_8$ | $\vec{X}_{F-8}$ (30°) | $t_{27}$ / F-27 |
| w5 | $s_6, s_7, s_8, s_9$ | $\vec{X}_{F-9}$ (30°) | $t_{27}$ / F-27 |

DYNAMIC GRAPHICS RENDERING BASED ON PREDICTED SACCADE LANDING POINT

CROSS REFERENCE TO RELATED APPLICATIONS

This application is related to U.S. application Ser. No. 14/845,862 entitled "Apparatus and Method for Dynamic Graphics Rendering Based on Saccade Detection," filed on Sep. 4, 2015, the disclosure of which is hereby incorporated by reference in its entirety. This application is related to U.S. application Ser. No. 15/086,645, entitled "Real-Time User Adaptive Foveated Rendering," filed on Mar. 31, 2016, the disclosure of which is hereby incorporated by reference in its entirety. This application is related to U.S. application Ser. No. 15/086,953, entitled "Reducing Rendering Computation and Power Consumption by Detecting Saccades and Blinks," filed on Mar. 31, 2016, the disclosure of which is hereby incorporated by reference in its entirety. This application is related to U.S. application Ser. No. 15/087,471, entitled "Reducing Rendering Computation and Power Consumption by Detecting Saccades and Blinks," filed on Mar. 31, 2016, the disclosure of which is hereby incorporated by reference in its entirety. This application is related to U.S. application Ser. No. 15/087,629, entitled "Selective Peripheral Vision Filtering in a Foveated Rendering System," filed on Mar. 31, 2016, the disclosure of which is hereby incorporated by reference in its entirety. This application is related to co-owned and co-pending application, entitled "Eye Tracking With Prediction and Late Update to GPU for Fast Foveated Rendering in an HMD Environment," Ser. No. 15/982,312, filed on the same date, the disclosure of which is hereby incorporated by reference in its entirety.

TECHNICAL FIELD

The present disclosure is related to computer generated images, and more specifically to real-time rendering of computer generated graphics.

BACKGROUND OF THE DISCLOSURE

Computer rendering of virtual reality (VR) scenes in a rendering pipeline requires central processing unit (CPU) and graphic processing unit (GPU) resources. A VR scene may be rendered over a wide viewing range, though only a smaller portion of that viewing range is displayed. In addition, VR scenes may be more complex than traditional scenes, and also may require a higher frame rate for image processing to avoid motion sickness, all of which results in a high rate of power consumption.

To save power, portions of a display may be presented in higher resolution than other portions. For example, a portion of the screen that a user may be fixated on may be presented in higher resolution than other portions that the user is not fixated, such as those areas in the periphery. Rendering at lower resolution portions of the display in the periphery may save processing resources, and because the user does not focus on the periphery that low resolution does not reduce the user's viewing experience. However, the movement of the eyes of a user viewing the VR scenes may be quicker than frames are updated through the rendering pipeline. As such, because the eye is quicker than the computer rendering pipeline, when the user moves to a portion of the scene that previously may have been in the periphery that portion may still be presented at low resolution until the updating catches up with the eye movement. This results in a blurry image for the user.

It is in this context that embodiments of the disclosure arise.

SUMMARY

Embodiments of the present disclosure relate to predicting a landing point of a saccade associated with a user viewing a display of a head mounted display (HMD). Several inventive embodiments of the present disclosure are described below.

In one embodiment, a method for predicting eye movement in an HMD is disclosed. The method including tracking movement of an eye of a user with a gaze tracking system disposed in the HMD at a plurality of sample points. The method including determining velocity of the movement based on the movement of the eye. The method including determining that the eye of the user is in a saccade upon the velocity reaching a threshold velocity. The method including predicting a landing point on the display of the HMD corresponding to a direction of the eye for the saccade.

In another embodiment, a method for predicting a landing point of a saccade associated with a user viewing a display is disclosed. The method includes tracking movement of an eye of a user with an eye tracking system. The eye tracking system is configured to collect eye orientation data of the eye within a physical viewing space at a plurality of sample points. During tracking, the eye of the user is viewing a sequence of video frames generated through execution of an application and presented on a display. The method includes identifying the eye of the user is in a saccade at a first sample point. The method includes accessing eye orientation data after saccade identification. The eye orientation data corresponds to a set of sample points collected from the eye tracking system, wherein at least one sample point of the set occurs during the saccade. The method includes predicting a final fixation direction of the eye in the physical viewing space at the end of the saccade based on the eye orientation data of the set of sample points.

In another embodiment, a non-transitory computer-readable medium storing a computer program for predicting eye movement in an HMD is disclosed. The computer-readable medium includes program instructions for tracking movement of an eye of a user with a gaze tracking system disposed in the HMD at a plurality of sample points. The computer-readable medium includes program instructions for determining velocity of the movement based on the movement of the eye. The computer-readable medium includes program instructions for determining that the eye of the user is in a saccade upon the velocity reaching a threshold velocity. The computer-readable medium includes program instructions for predicting a landing point on the display of the HMD corresponding to a direction of the eye for the saccade.

In still another embodiment, a computer system is disclosed having a processor and memory coupled to the processor, the memory having stored therein instructions that, if executed by the computer system, cause the computer system to execute a method for predicting eye movement in an HMD. The method including tracking movement of an eye of a user with a gaze tracking system disposed in the HMD at a plurality of sample points. The method including determining velocity of the movement based on the movement of the eye. The method including determining that the eye of the user is in a saccade upon the velocity reaching a threshold velocity. The method including predicting a landing point on the display of the HMD corresponding to a direction of the eye for the saccade.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1A:
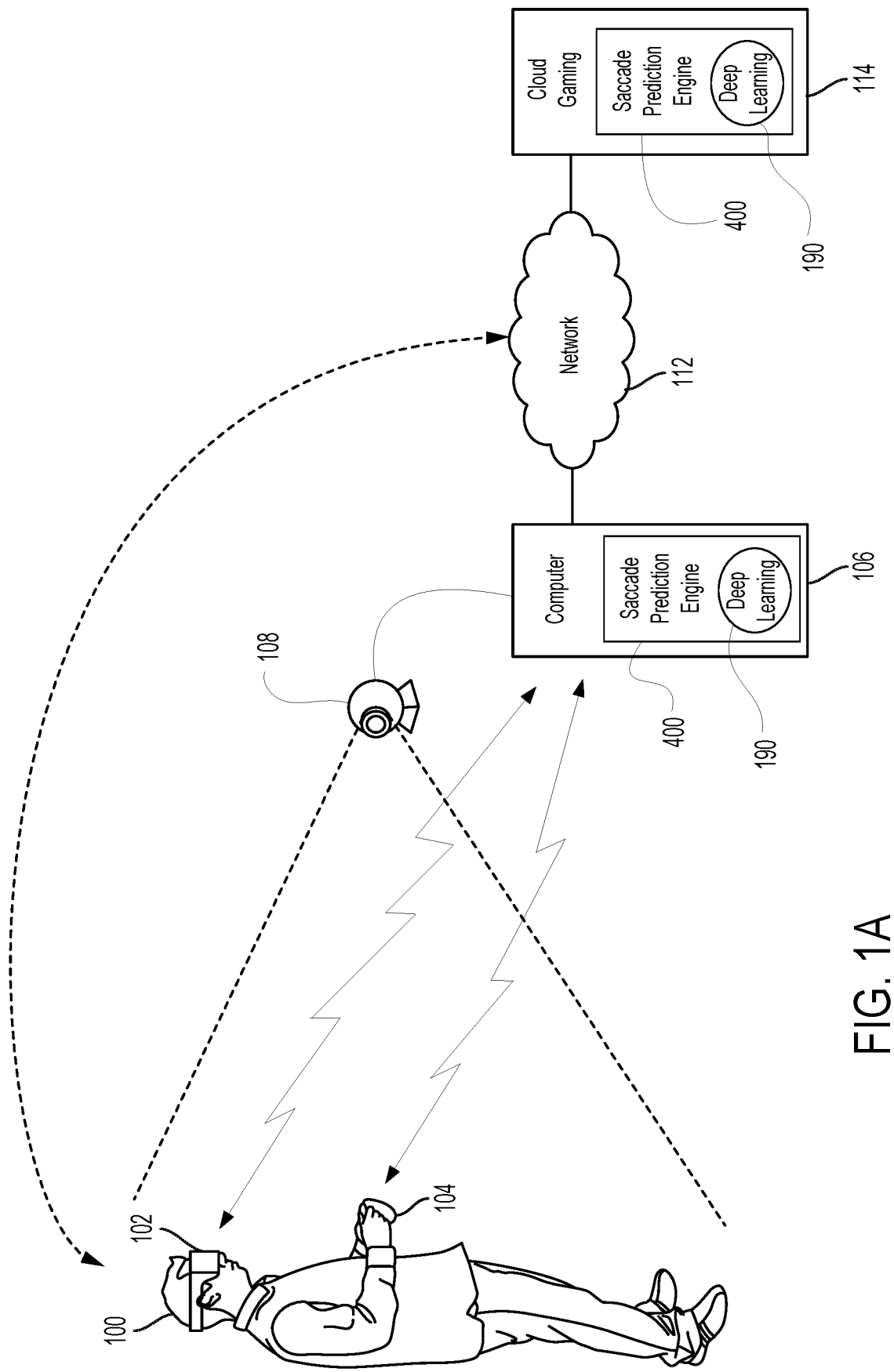
FIG. 1A illustrates a system configured for providing an interactive experience with VR content and for predicting a landing point of a saccade associated with a user viewing a display of an HMD, wherein some input control may be provided through a handheld controller, and some input control may be managed through tracking of body parts as implemented through a camera, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods for predicting a landing point on a display that is associated with the gaze direction of an eye of a user during and/or at the end of a saccade defined in association with the user viewing a display of an HMD. Specifically, when the gaze of the user moves in normal fashion from one fixation point to another fixation point, a velocity graph of measured portions of the saccade defining the user's eye movement can be used to predict the characteristics throughout the entire saccade. As such, one or more eye directions can be predicted based on the velocity analysis, wherein the eye directions correspond to one or more landing points on the display. Once a targeted landing point of the display is known, frames that are rendered for display on the HMD may be updated with consideration of the targeted landing point. For example, a foveal region of the display that corresponds to an area at or surrounding the targeted landing point may be updated, such that the movement of the eye coincides with the display of the foveal region at the targeted landing point. The foveal region (e.g., where the eye is focused and directed towards) is rendered at high resolution, and non-foveal regions (e.g., periphery) may be rendered at lower resolution.

With the above general understanding of the various embodiments, example details of the embodiments will now be described with reference to the various drawings.

Throughout the specification, the reference to "gaming application" is meant to represent any type of interactive application that is directed through execution of input commands. For illustration purposes only, an interactive application includes applications for gaming, word processing, video processing, video game processing, etc. Further, the terms video game and gaming application are interchangeable.

Throughout the specification, reference is made to a saccade of a user. In general, a saccade references a quick and simultaneous movement of the eye(s) of a user made when traversing from one fixation point on a display to another fixation point. Saccade movement of the eye(s) is made generally in a particular direction, and not necessarily in a rotational manner. The saccade movement may reach peak angular speeds of over 900 degrees per second, and last anywhere from 20-200 milliseconds (ms). The angular displacement (degrees) of the eye(s) during a saccade may range upwards to approximately 90 degrees, though a displacement of more than 20-50 degrees may be accompanied by head movement.

FIG. 1A illustrates a system for interactive gameplay of a gaming application, in accordance with an embodiment of the disclosure. A user 100 is shown wearing an HMD 102, wherein the HMD 102 is worn in a manner similar to glasses, goggles, or a helmet, and is configured to display a video game from an interactive gaming application or other content from interactive application, to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

The system in FIG. 1A is configured to update targeted landing points on a display of HMD 102 such that movement of the eye(s) of a user coincides with the presentation of a foveal region on the display at the updated targeted landing point. In particular, saccade prediction of the landing points may be performed at one or more of the HMD 102, the computer 106, and the cloud gaming server 114, alone or in combination. Prediction is performed by the saccade prediction engine 300 that includes a deep learning engine 190 configured to perform one or both of generating through training models of saccades based on saccades measured (e.g., collection of eye orientation data or parameters) for test subjects; and comparing eye orientation data of a current saccade of a user against the trained models of saccades to predict landing points on the display that is associated with a gaze direction of a user during and/or at the end of a saccade.

In one embodiment, the HMD 102 can be connected to a computer or gaming console 106. The connection to computer 106 can be wired or wireless. In some implementations, the HMD 102 may also communicate with the computer through alternative mechanisms or channels, such as via network 112 to which both HMD 102 and the computer 106 are connected. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a gaming application, and output the video and audio from the gaming application for rendering by the HMD 102. The computer 106 is not restricted to executing a gaming application but may also be configured to execute an interactive application, which outputs VR content 191 for rendering by the HMD 102. In one embodiment, computer 106 is configured to predict a landing point on a display of an HMD associated with the gaze direction of an eye of a user during and/or at the end of a saccade that is defined in association with the user viewing the display. In other embodiments, the prediction of the landing point may be performed by one or more of the HMD 102, computer 106, and cloud gaming server 114, alone or in combination.

The user 100 may operate a controller 104 to provide input for the gaming application. The connection to computer 106 can be wired or wireless. Additionally, a camera 108 can be configured to capture one or more images of the interactive environment in which the user 100 is located. These captured images can be analyzed to determine the location and movements of the user 100, parts of the user (e.g., tracking hand gestures for input commands), the HMD 102, and the controller 104. In one embodiment, the controller 104 includes a light or other marker elements which can be tracked to determine its location and orientation. Additionally, HMD 102 may include one or more lights which can be tracked to determine the location and orientation of the HMD 102. The tracking functionality as implemented in part by camera 108 provides for input commands generated through movement of the controller 104 and/or body parts (e.g., hand) of the user 100. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the gaming application being played by the user 102. The computer 106 transmits inputs from the HMD 102, the controller 104 and the camera 108, to the cloud gaming provider, which processes the inputs to affect the game state of the executing gaming application. The output from the executing gaming application, such as video data, audio data, and haptic feedback data, is transmitted to the computer 106. The computer 106 may further process the data before transmission or may directly transmit the data to the relevant devices. For example, video and audio streams are provided to the HMD 102, whereas the haptic feedback data is used to generate a vibration feedback command, which is provided to the controller 104.

In one embodiment, the HMD 102, controller 104, and camera 108, may themselves be networked devices that connect to the network 110 to communicate with the cloud gaming provider 112. For example, the computer 106 may be a local network device, such as a router, that does not otherwise perform video game processing, but facilitates passage network traffic. The connections to the network by the HMD 102, controller 104, and camera (i.e., image capture device) 108 may be wired or wireless.

In yet another embodiment, the computer 106 may execute a portion of the gaming application, while the remaining portion of the gaming application may be executed on a cloud gaming provider 112. In other embodiments, portions of the gaming application may also be executed on HMD 102. For example, a request for downloading the gaming application from the computer 106 may be serviced by the cloud gaming provider 112. While the request is being serviced, the cloud gaming provider 112 may execute a portion of the gaming application and provide game content to the computer 106 for rendering on the HMD 102. The computer 106 may communicate with the cloud gaming provider 112 over a network 110. Inputs received from the HMD 102, the controller 104 and the camera 108, are transmitted to the cloud gaming provider 112, while the gaming application is downloading on to the computer 106. The cloud gaming provider 112 processes the inputs to affect the game state of the executing gaming application. The output from the executing gaming application, such as video data, audio data, and haptic feedback data, is transmitted to the computer 106 for onward transmission to the respective devices.

Once the gaming application has been completely downloaded to the computer 106, the computer 106 may execute the gaming application and resume game play of the gaming application from where it was left off on the cloud gaming provider 112. The inputs from the HMD 102, the controller 104, and the camera 108 are processed by the computer 106, and the game state of the gaming application is adjusted, in response to the inputs received from the HMD 102, the controller 104, and the camera 108. In such embodiments, a game state of the gaming application at the computer 106 is synchronized with the game state at the cloud gaming provider 112. The synchronization may be done periodically to keep the state of the gaming application current at both the computer 106 and the cloud gaming provider 112. The computer 106 may directly transmit the output data to the relevant devices. For example, video and audio streams are provided to the HMD 102, whereas the haptic feedback data is used to generate a vibration feedback command, which is provided to the controller 104.

Figure 1B:
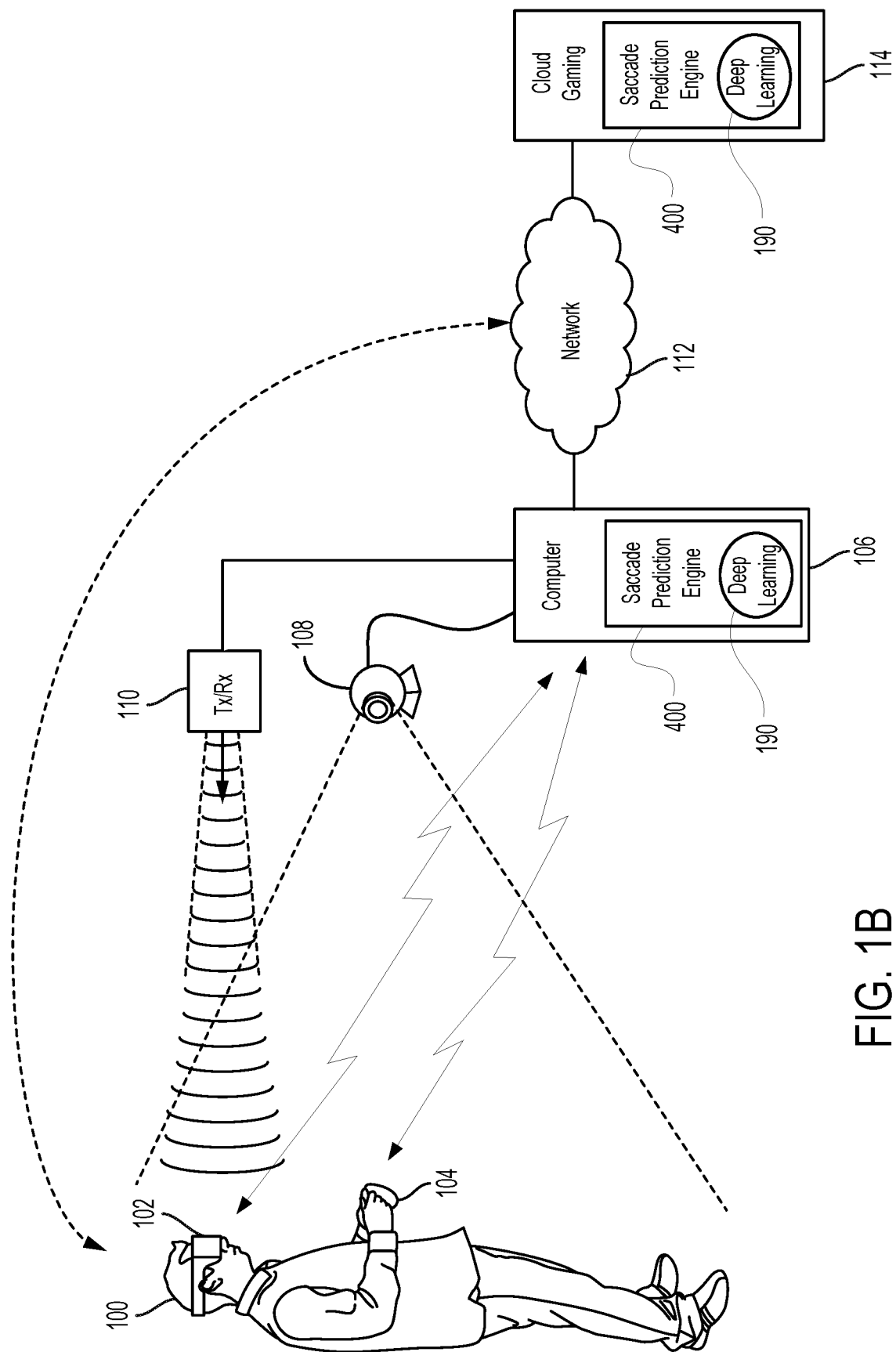
FIG. 1B illustrates a system configured for providing an interactive experience with VR content and for predicting a landing point of a saccade associated with a user viewing a display of an HMD, wherein some input control for editing may be provided through a handheld controller, and some input control may be managed through tracking of body parts as implemented through a camera, wherein the camera also tracks movement of the HMD for purposes of beam tracking of an RF emitter transmitting data to the HMD, in accordance with one embodiment of the present disclosure.

FIG. 1B illustrates a system configured for providing an interactive experience with VR content and for providing a 3D editing space for editing of 3D digital content, in accordance with one embodiment of the present disclosure. In addition, the system (e.g., HMD 102, computer 106, and/or cloud 114) is configured to update targeted landing points on a display of HMD 102 such that movement of the eye(s) of a user coincides with the presentation of a foveal region (area of high resolution) on the display at the updated targeted landing point. FIG. 1B is similar to the system described in FIG. 1A, with the addition of the transmitter/receiver (transceiver) 110 that is configured for data delivery to the HMD 102 via RF signals, for example. The transceiver 110 is configured to transmit (by wired connection or wireless connection) the video and audio from the gaming application to the HMD 102 for rendering thereon. In addition, the transceiver 110 is configured to transmit images, video, and audio of 3D digital content within a 3D editing space for purposes of editing. In this implementation, camera 108 may be configured to track movement of the HMD 102, such that the transceiver 110 may beam steer the majority of its RF power (as delivered through an RF radiation pattern) to the HMD 102 (e.g., for purpose of delivering data), in accordance with one embodiment of the present disclosure.

Figure 1C:
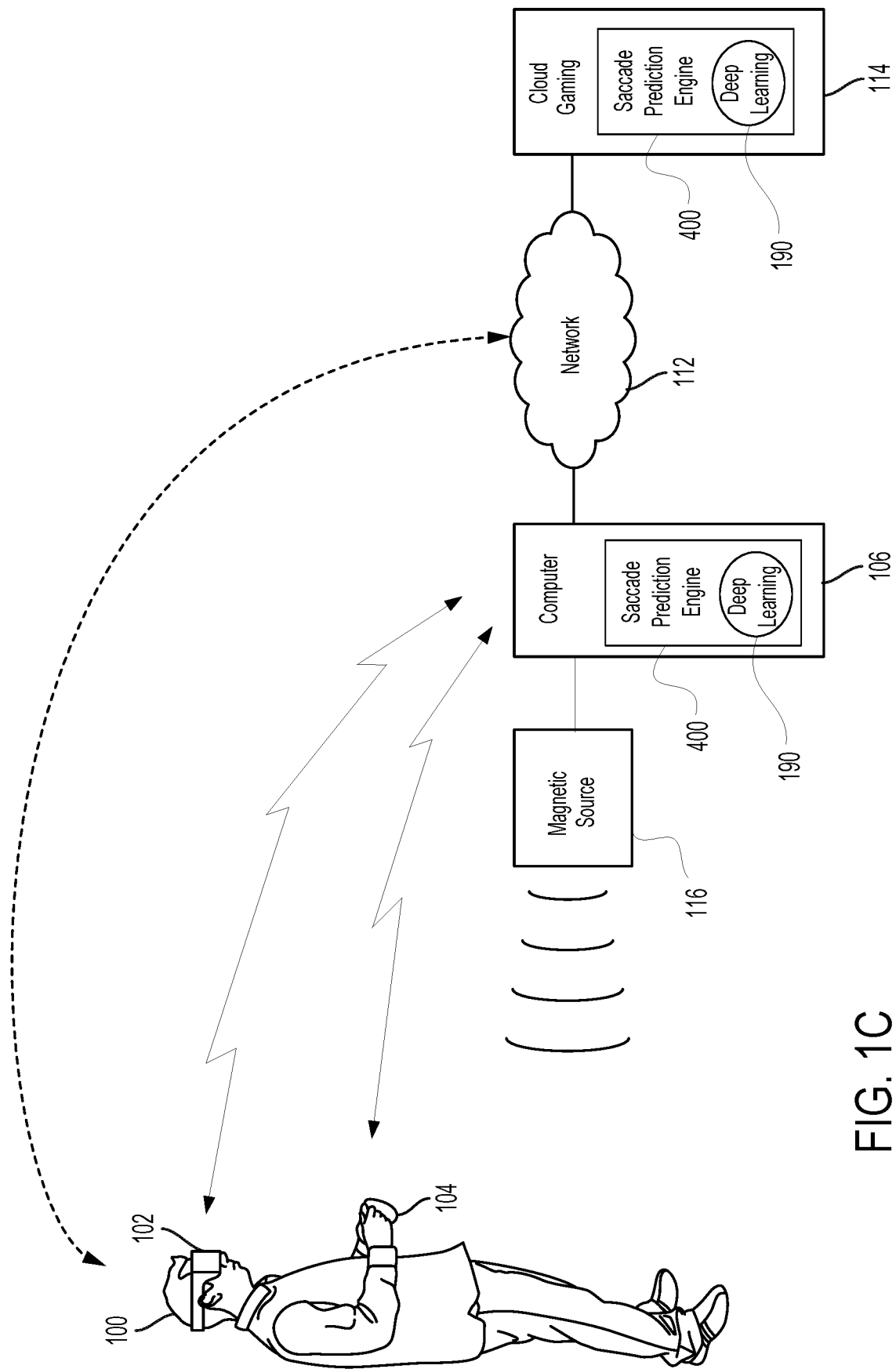
FIG. 1C illustrates a system configured for providing an interactive experience with VR content and for predicting a landing point of a saccade associated with a user viewing a display of an HMD, wherein some input control for editing may be provided through a handheld controller, and some input control may be managed through the magnetic tracking of body parts as implemented in part through a magnetic source, in accordance with one embodiment of the present disclosure.

FIG. 1C illustrates a system configured for providing an interactive experience with VR content, in accordance with one embodiment of the present disclosure. In addition, the system (e.g., HMD 102, computer 106, and/or cloud 114) is configured to update targeted landing points on a display of HMD 102 such that movement of the eye(s) of a user coincides with the presentation of a foveal region (area of high resolution) on the display at the updated targeted landing point. FIG. 1C is similar to the system described in FIG. 1A, with the addition of the magnetic source 116 configured to emit a magnetic field to enable magnetic tracking of the HMD 102, controller 104 (e.g., configured as an interface controller), or any object configured with magnetic sensors (e.g., gloves, strips located on body parts—such as fingers, etc.). For example, the magnetic sensors could be inductive elements. In particular, the magnetic sensors can be configured to detect the magnetic field (e.g., strength, orientation) as emitted by the magnetic source 116. The information gathered from the magnetic sensors can be used to determine and track the location and/or orientation of the HMD 102, controller 104, and other interface objects, etc. in order to provide input commands as executed within the 3D editing space. In embodiments, the magnetic tracking is combined with tracking performed through the camera 108 and/or inertial sensors within the HMD 102, controller 104 and/or other interface objects.

In some implementations, the interface object (e.g., controller 104) is tracked relative to the HMD 102. For example, the HMD 102 may include an externally facing camera that captured images including the interface object. In other embodiments, HMD 102 may include an IR emitter used for tracking external objects, such as the interface object. The captured images may be analyzed to determine the location/orientation of the interface object relate to the HMD 102, and using a known location/orientation of the HMD 102, so as to determine the location/orientation and/or movement of the interface object in the local environment.

The way the user 100 interfaces with the virtual reality scene of a gaming application, or of the 3D editing space, displayed in the HMD 102 can vary, and other interface devices in addition to the interface object (e.g., controller 104), can be used. For instance, various kinds of single-handed, as well as two-handed controllers 104 can be used. In some implementations, the controllers 104 themselves can be tracked by tracking lights included in the controllers, or tracking of shapes, sensors, and inertial data associated with the controllers 104. Using these various types of controllers 104, or even simply hand gestures that are made and captured by one or more cameras, and magnetic sensors, it is possible to interface, control, maneuver, interact with, and participate in the virtual reality gaming environment presented on the HMD 102.

Figure 2:
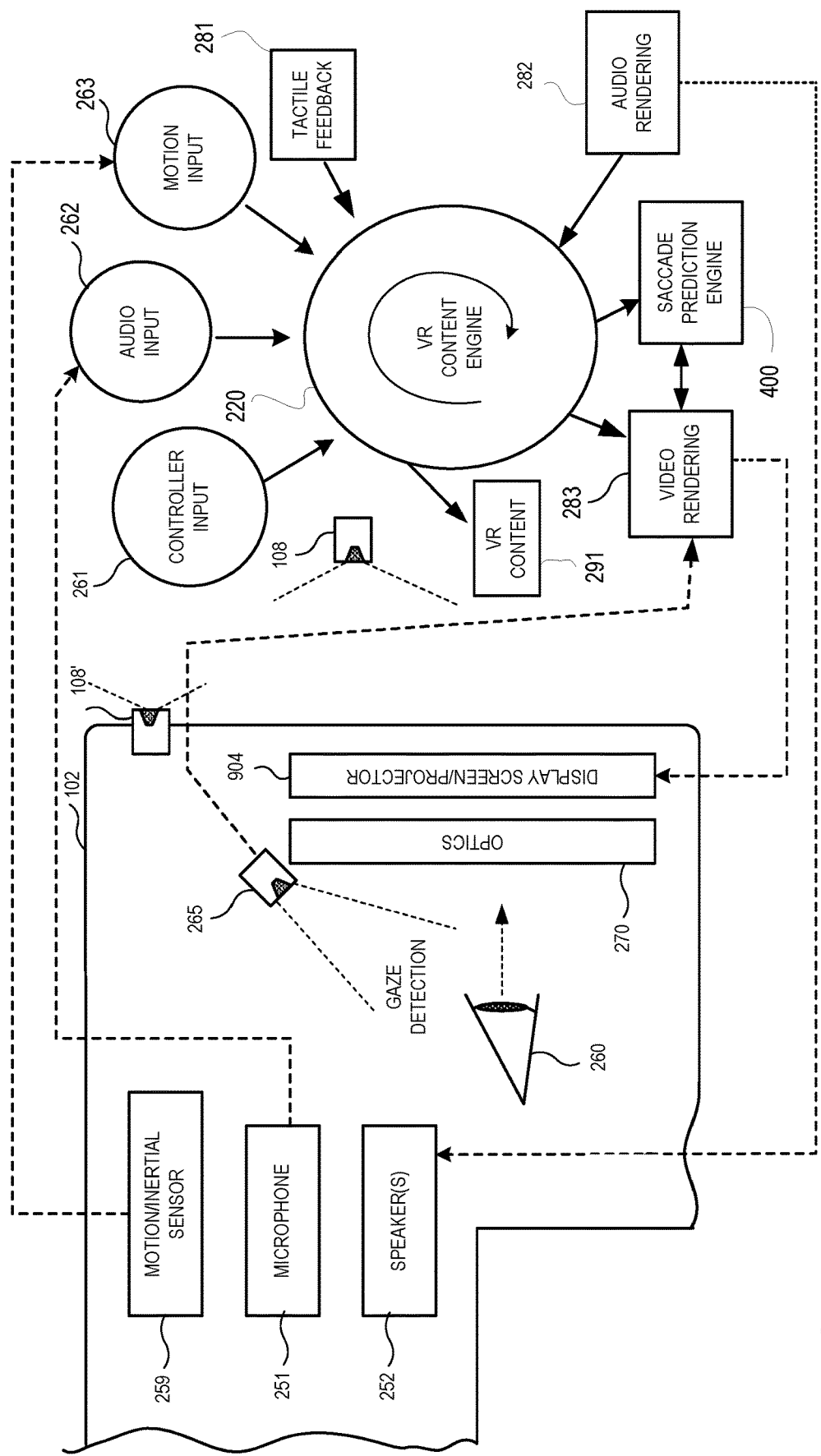
FIG. 2 conceptually illustrates the function of a HMD in conjunction with executing video game and for providing a 3D editing space for editing of 3D digital content, in accordance with an embodiment of the disclosure.

FIG. 2 conceptually illustrates the function of a HMD 102 in conjunction with the generation of VR content 291 (e.g., execution of an application and/or video game, etc.), to include update targeted landing points on a display of the HMD 102 such that movement of the eye(s) of a user coincides with the presentation of a foveal region (e.g., high resolution area) on the display at an updated targeted landing point, in accordance with an embodiment of the disclosure. Saccade prediction of the landing point may be performed by one or more of HMD 102, computer 106, and cloud gaming server 114, alone or in combination. In embodiments, the VR content engine 220 is being executed on HMD 102. In other embodiments, the VR content engine 220 is being executed on a computer 106 (not shown) that is communicatively coupled to the HMD 102, and/or in combination with the HMD 102. The computer may be local to the HMD (e.g., part of local area network) or may be remotely located (e.g., part of a wide area network, a cloud network, etc.) and accessed via a network. The communication between the HMD 102 and the computer 106 may follow a wired or a wireless connection protocol. In an example, the VR content engine 220 executing an application may be a video game engine executing a gaming application, and is configured to receive inputs to update a game state of the gaming application. The following description of FIG. 2 is described within the context of the VR content engine 220 executing a gaming application, for purposes of brevity and clarity, and is intended to represent the execution of any application capable of generating VR content 291. The game state of the gaming application can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the VR content engine 220 receives, by way of example, controller input 261, audio input 262 and motion input 263. The controller input 261 may be defined from the operation of a gaming controller separate from the HMD 102, such as a hand-held gaming controller 104 (e.g. Sony DUALSHOCK®4 wireless controller, Sony PlayStation® Move motion controller) or wearable controllers, such as wearable glove interface controller, etc. By way of example, controller input 261 may include directional inputs, button presses, trigger activation, movements, gestures or other kinds of inputs processed from the operation of a gaming controller. The audio input 262 can be processed from a microphone 251 of the HMD 102, or from a microphone included in the image capture device 208 or elsewhere within the local system environment. The motion input 263 can be processed from a motion sensor 259 included in the HMD 102, or from image capture device 108 as it captures images of the HMD 102. For example, in the case of executing a gaming application, the VR content engine 220 receives inputs which are processed according to the configuration of the content engine 220 operating as a game engine to update the game state of the video game. The engine 220 outputs game state data to various rendering modules which process the game state data to define content which will be presented to the user.

In the illustrated embodiment, a video rendering module 283 is defined to render a video stream for presentation on the HMD 102.

A lens of optics 270 in the HMD 102 is configured for viewing the VR content 291. A display screen 904 is disposed behind the lens of optics 270, such that the lens of optics 270 is between the display screen 904 and an eye 260 of the user, when the HMD 102 is worn by the user. In that manner, the video stream may be presented by the display screen/projector mechanism 904, and viewed through optics 270 by the eye 260 of the user. An HMD user may elect to interact with the interactive VR content 291 (e.g., VR video source, video game content, etc.) by wearing the HMD for purposes of editing 3D digital content in the 3D editing space, for example. Interactive virtual reality (VR) scenes from a video game may be rendered on the display screen 904 of the HMD. In that manner, during game development the HMD 102 allows the user to edit and review the interactive VR scenes. Also, during game play (to include reviewing edits) the HMD allows the user to completely immerse in the game play by provisioning display mechanism of the HMD in close proximity to the user's eyes. The display regions defined in the display screen of the HMD for rendering content may occupy large portions or even the entirety of the field of view of the user. Typically, each eye is supported by an associated lens of optics 270 which is viewing one or more display screens.

An audio rendering module 282 is configured to render an audio stream for listening by the user. In one embodiment, the audio stream is output through a speaker 152 associated with the HMD 102. It should be appreciated that speaker 152 may take the form of an open air speaker, headphones, or any other kind of speaker capable of presenting audio.

In one embodiment, a gaze tracking sensor 265 is included in the HMD 102 to enable tracking of the gaze of the user. Although only one gaze tracking sensor 265 is included, it should be noted that more than one gaze tracking sensors may be employed to track the gaze of the user, as will be described in relation to FIGS. 3A-3C. For instance, in some embodiments, only one eye is tracked (e.g., using one sensor), while in other embodiments, two eyes are tracked with multiple sensors. Gaze tracking sensor 265 may be one or more of a camera, an optical sensor, an infrared sensor, an EMG (electromyography) sensor, an optical reflector sensor, a range sensor, and optical flow sensor, a Doppler sensor, a microphone, and the like. Generally, sensor 265 may be configured to detect rapid eye movements such as a change in eye movement direction, acceleration, and speed. For example, a gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized. In embodiments of the present disclosure gaze direction and/or other eye orientation data may be used for predicting a landing point on a display of an HMD that is associated with a corresponding gaze direction of the eye(s) of a user during and/or at the end of a saccade defined in association with the user viewing the display. Saccade prediction may be performed by the saccade prediction engine 400, which is further described in relation to FIGS. 4A-4C. Saccade prediction engine 400 may also work in conjunction with a deep learning engine 190 that is configured to perform repetitive and computationally intensive operations. Specifically, the deep learning engine 190 may include and perform the functions of saccade modeling and saccade prediction used for updating targeted landing points on a display of the HMD 102 such that movement of the eye(s) of the user coincides with the presentation of a foveal region (high resolution area) on the display at the updated targeted landing point. It should be appreciated that the gaze direction of the user can be defined relative to the head mounted display, relative to a real environment in which the user is situated, and/or relative to a virtual environment that is being rendered on the head mounted display. Since the gaze direction may be defined relative to the screen of the HMD, the gaze direction may be converted to a location on the screen. That location may be the center of a foveal region rendered at high resolution for a frame.

Broadly speaking, analysis of images captured by the gaze tracking sensor 265, when considered alone, provides for a gaze direction of the user relative to the HMD 102. However, when considered in combination with the tracked location and orientation of the HMD 102, a real-world gaze direction of the user may also be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 281 is configured to provide signals to tactile feedback hardware included in either the HMD 102 or another device operated by the HMD user, such as a controller 104. The tactile feedback may take the form of various kinds of tactile sensations, such as vibration feedback, temperature feedback, pressure feedback, etc.

Figure 3A:
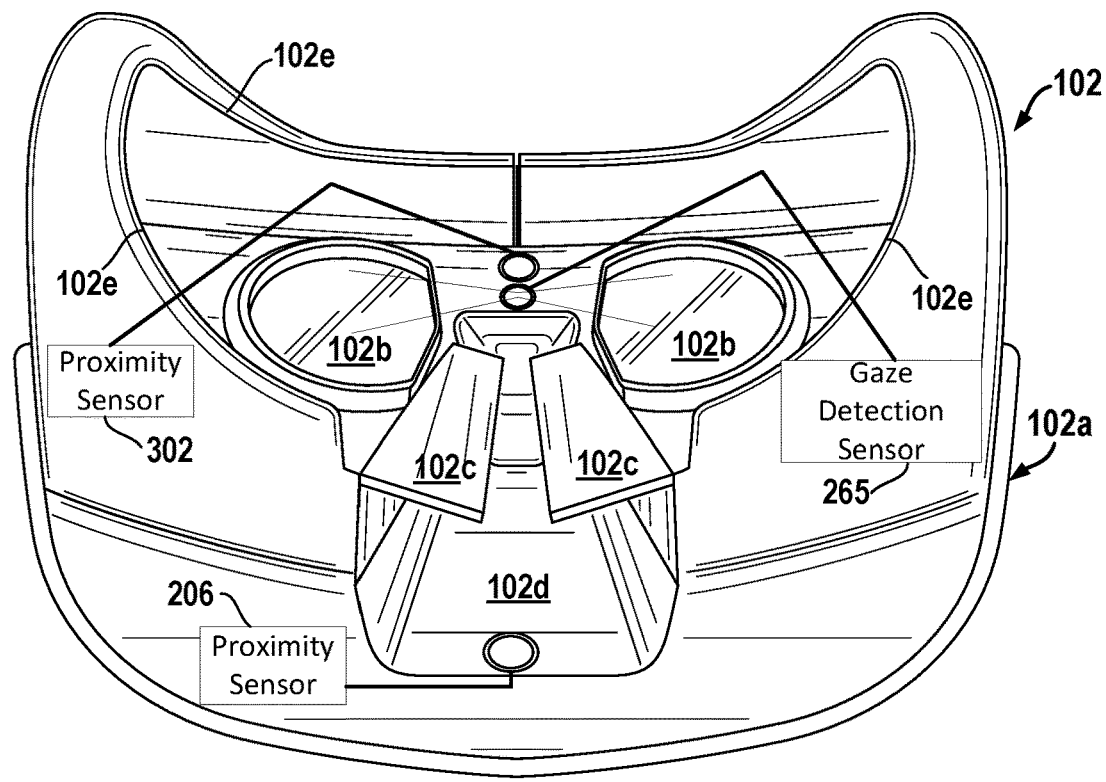
FIGS. 3A-3C illustrates views of one example display housing, when looking into the inner surfaces where the face is designed to meet with the display housing that show the inner portions of an HMD including eye tracking sensors, in accordance with one embodiment.
Figure 3B:
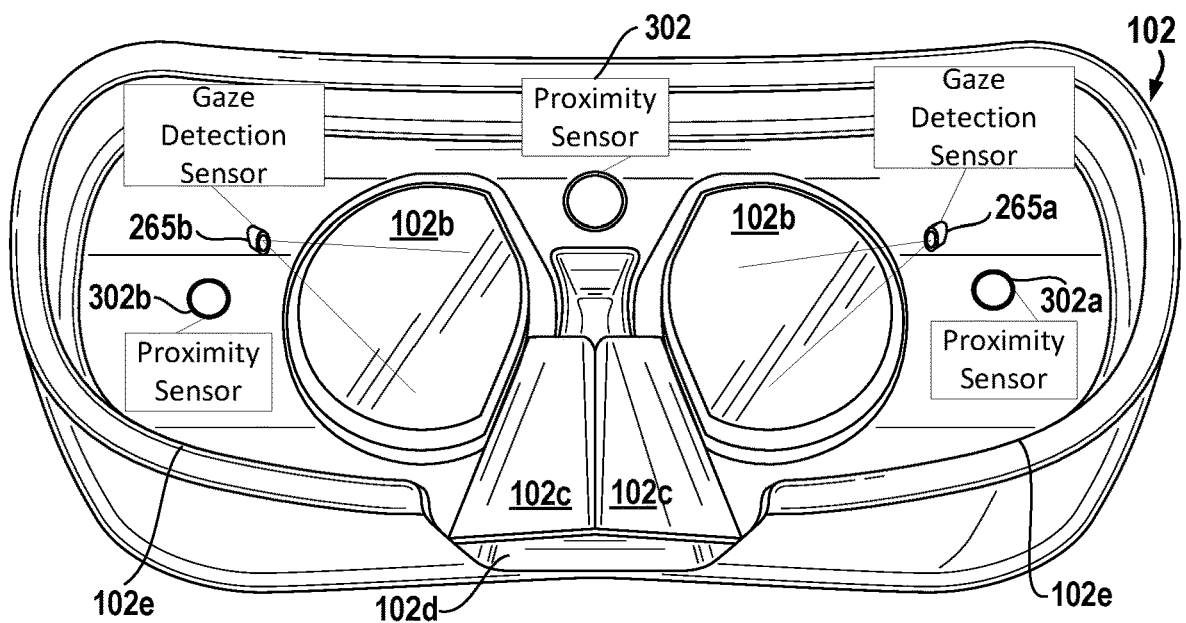
Figure 3C:
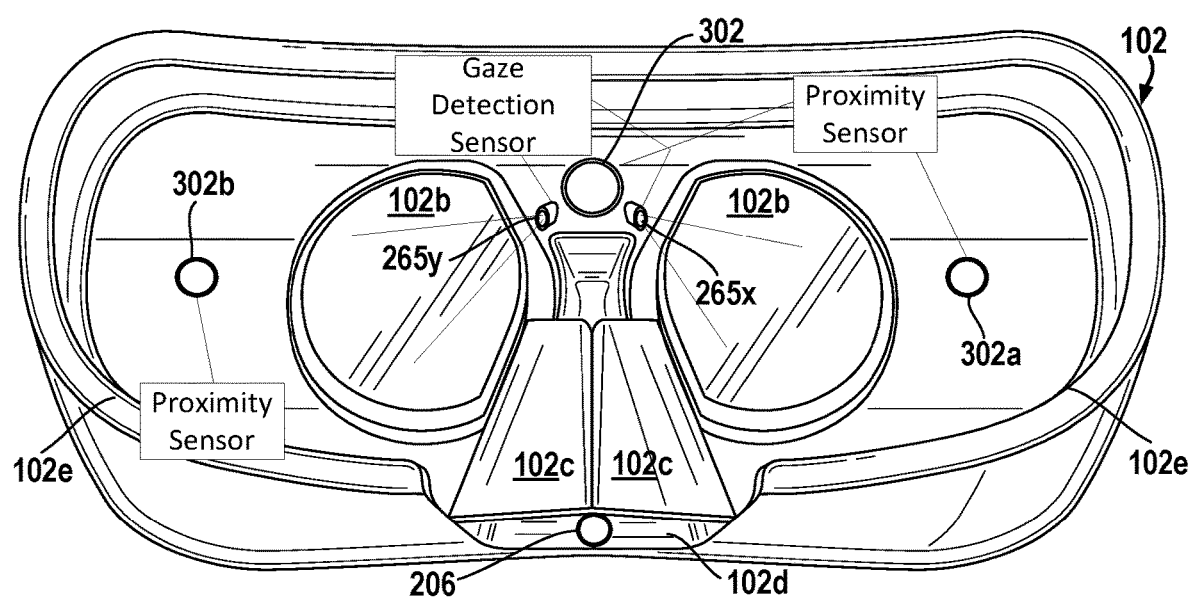

FIGS. 3A-3C illustrates views of one example display housing, when looking into the inner surfaces where the face is designed to meet with the display housing that show the inner portions of an HMD including eye tracking sensors, in accordance with one embodiment.

In particular, FIG. 3A illustrates a view of example display housing 102a, when looking into the inner surfaces where the face is designed to meet with the display housing 102a. As shown, an interface surface 102e surrounds the display housing 102a, so that when worn, the display housing 102a substantially covers the eyes of the user and facial features surrounding the eyes. This provides for reduction in light into the area where the user is viewing through the optics 102b, and therefore provides for more realistic viewing into the virtual-reality scenes provided by the HMD 102. When the display housing 102a is placed onto the head of the user, the user's nose may slide into or fit within the nose insert region 102d. The nose insert region 102d is an area between the optics 102b, at a lower portion of the display housing 102a.

The flaps 102c, are designed to move or flex when the nose of the user is placed at least partially into the nose insert region 102d. Proximity sensor 206, as shown, is integrated within the display housing 102a and directed toward the area in the nose insert region 102d, so as to capture information when the nose of the user is placed at least partially within the nose insert region 102d. Flaps 102c are designed to fit adjacent to the user's nose, and the flaps assist in keeping light from filtering toward the optics 102b and the user's eyes when the display housing 102a is placed over the users face.

Also shown in FIG. 3A, a proximity sensor 302 is integrated into the inner surface of the display housing 102a, and is located between the optics 102b. The placement of the proximity sensor 302 is therefore going to be spaced apart from the user's forehead, which may come closer to the interface surface 102e. However, the presence of the user's face in the HMD 102 can be sensed by the proximity sensor 302. Additionally, the proximity sensor 302 can also sense information regarding distance, textures, images, and/or generally characteristics of the users face when the HMD 102 is worn. As mentioned above, the proximity sensor 302 may be defined by multiple sensors, which may be integrated in the same location or in different locations within the display housing 102a.

Also shown is a gaze detection sensor 265, which may be integrated in a location between the optics 102b of the display housing 102a. The gaze detection sensor 265 is configured to monitor the movement of the user's eyes when looking through the optics 102b. The gaze detection sensor can be used to identify locations of where the user is looking in the VR space. In further embodiments, if the user's eyes are monitored using gaze detection sensor 265, this information can be used for the avatar face of the user, so that the avatar face has eyes that moves similar to the movements of the user's eyes. The gaze detection sensor 265 can also be used to monitor when the user may be experiencing motion sickness.

The gaze detector sensors 265 are configured for capturing one or more parameters related to eye orientation. The information from the gaze detector sensors 265 may be used to determine gaze direction (e.g., angle θ) of the eye(s) of a user based on the orientation of the eye pupils, wherein the pupil is the opening in the center of the eye that allows light to enter and strike the retina. The gaze detector sensors 265 may work in conjunction with one or more light sources (not shown) emitting energy of one or more wavelengths of non-visible light (e.g., infrared) used to illuminate the eye (s). For example, the light sources may be light emitting diodes (LEDs) directing the light energy towards the eye(s). The gaze detector sensors 265 may be used to capture reflections off the pupil, cornea, and/or iris of an eye, wherein the reflections are then analyzed (e.g., by a processor in HMD 102, computer 106, etc.) to determine gaze direction and/or orientation of the pupil, which is translatable to gaze direction of the eye(s). The gaze direction (e.g., angle θ) may be referenced with respect to the HMD 102, and/or a real-world space. Various known techniques may be implemented to determine gaze orientation and/or direction, such as bright pupil tracking, dark pupil tracking, etc. A gaze tracking system 820 is shown including one or more light source(s) 401 and one or more gaze detection sensor(s) 265 shown in FIG. 4A that is configured for capturing eye orientation data that is used to determine direction and/or orientation of the pupil(s) and/or eye(s) of a user.

In addition, additional information may be determined based on the gaze direction. For example, eye movement data may be determined, such as velocity and acceleration of the eye(s). The tracked movement of the eye(s) may be used to determine a saccade of the user. Information from the sensors may also be used for tracking the head of the user. For example, information may be responsive to position, motion, orientation, change in orientation of the head. This information may be used to determine gaze direction within a real-world environment.

FIGS. 3B-3C also illustrates different perspective views of the HMD 102 that show various placement locations of the gaze direction sensors 265. For example, FIG. 3B is an example of gaze detection sensors 265a and 265b placed in the outer portion of the optics 102b, in order to capture eye gaze. FIG. 3C includes gaze detection sensors 265x and 265y located between the optics 102b, in order to capture eye gaze. The location of the gaze detection sensors can vary within the display housing 102a, and generally are positioned so as to provide a view directed toward the eyes of the user. These illustrations have been provided to show that the gaze detection sensors can be flexibly positioned in different locations within the HMD 102.

Figure 4A:
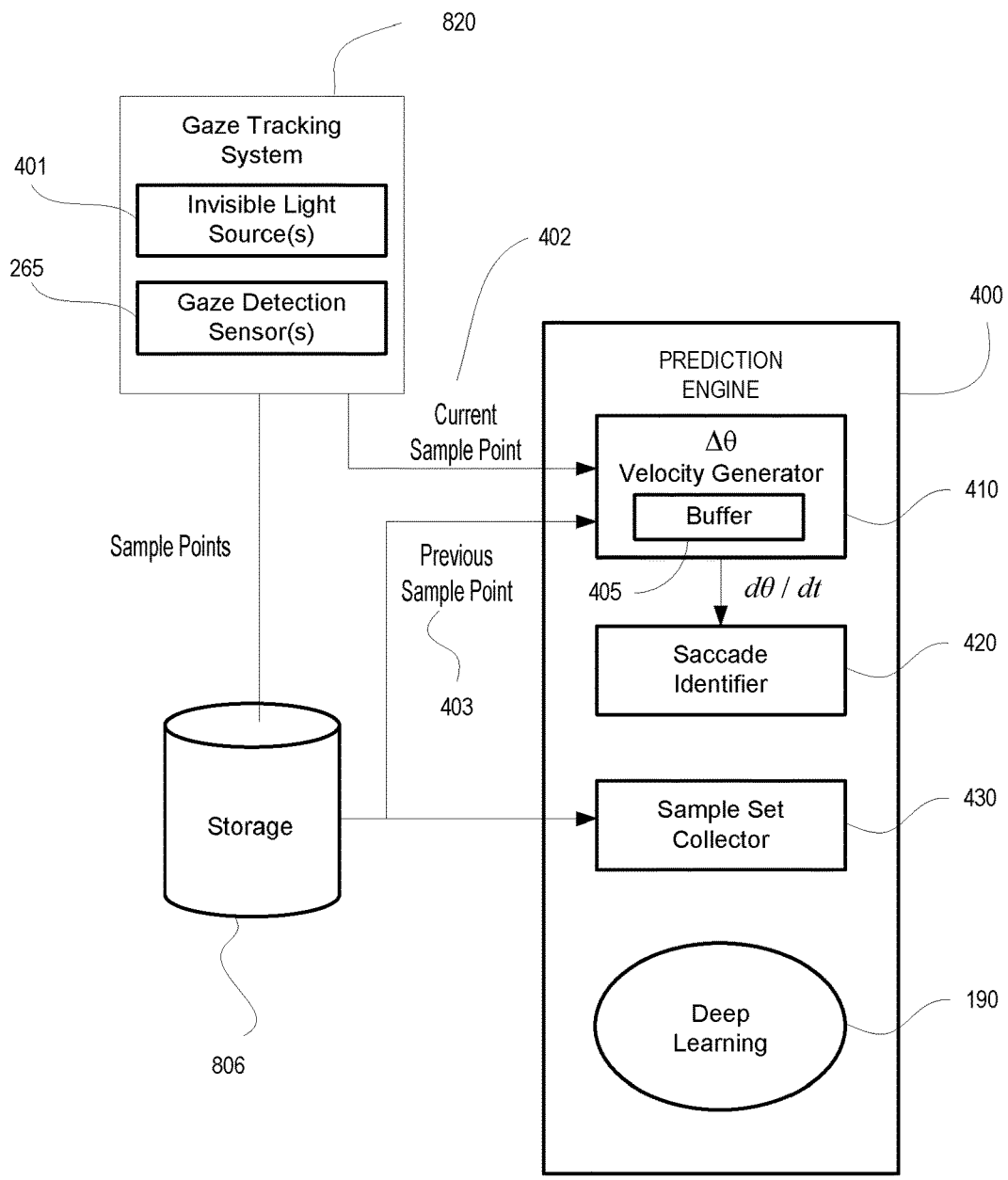
FIG. 4A illustrates a prediction engine configured for predicting a landing point of a saccade associated with a user viewing a display of an HMD, in accordance with one embodiment of the present disclosure.

FIG. 4A illustrates a prediction engine 400 configured for predicting a landing point of a saccade associated with a user viewing a display of an HMD, in accordance with one embodiment of the present disclosure. Prediction engine 400 may be located at one or more of HMD 102, computer 106, and cloud gaming server 114, as previously described.

As shown, gaze tracking system 820 is configured for determining gaze direction and/or orientation of the pupil(s) and/or eye(s) of a user. Gaze direction may be with respect to a display, such as a display of an HMD 102. As previously described, gaze tracking system 820 includes one or more light source(s) 401 and one or more gaze detection sensor(s) 265. In particular, information from the gaze tracking system 820 is collected at one or more sample points. For example, the information may be collected on a periodic basis, with a period that is sufficient for sampling the eye one or more times during a saccade. For example, information may include gaze direction of the eye(s) at a particular moment in time. The information for one or more sample points are retained in storage 806 for later access, including information for the current sample point.

In addition, information for the current sample point is delivered to the prediction engine 400 as an input. More particularly, the AO velocity generator 410 analyzes the information from the current sample point 402 and information from a previous sample point 403 (either delivered from storage 806 or retained in a buffer 405 accessible by the generator 410) to determine a velocity of the eye movement, in one embodiment. As such, velocity generator 410 is configured to determine velocity of the eye movement for a particular sample point based on information from the current sample point 402 and information from a previous sample point 403. For example, the information may be gaze direction at a particular time. In another embodiment, a centered difference estimate of velocity is performed, instead of a backwards difference. In that manner, it is possible to delay detection and use previous position and the next position to obtain a smoother estimate of velocity. This may help reduce false positives when performing saccade detections.

The velocity information (e.g., $d\theta/dt$) is provided as input to the saccade identifier 420. Various techniques may be employed by velocity generator 410 to determine when the eye movement of a user is within a saccade. In one embodiment, the eye and/or eye movement of the eye is within a saccade when the velocity meets and/or exceeds a threshold. The threshold is chosen to avoid noisy information that may not necessarily indicate that the eye is undergoing saccade. For example, the threshold is above a velocity typically found when the eye is performing smooth pursuit, such as when tracking an object. Purely for illustration, saccade detection may be performed within 10 ms.

As previously described, saccade defines the quick and simultaneous movement of the eye(s) of a user made when traversing from one fixation point on a display to another fixation point. The saccade movement may reach peak angular speeds of over 900 degrees per second, and last anywhere from 20-200 milliseconds (ms). At a frame rate of 120 Hertz (Hz), the saccade may last anywhere between 2 to 25 frames. For example, an HMD refreshes at a rate of 90 or 120 Hz to minimize discomfort of the user (e.g., through motion sickness).

Figure 4B:
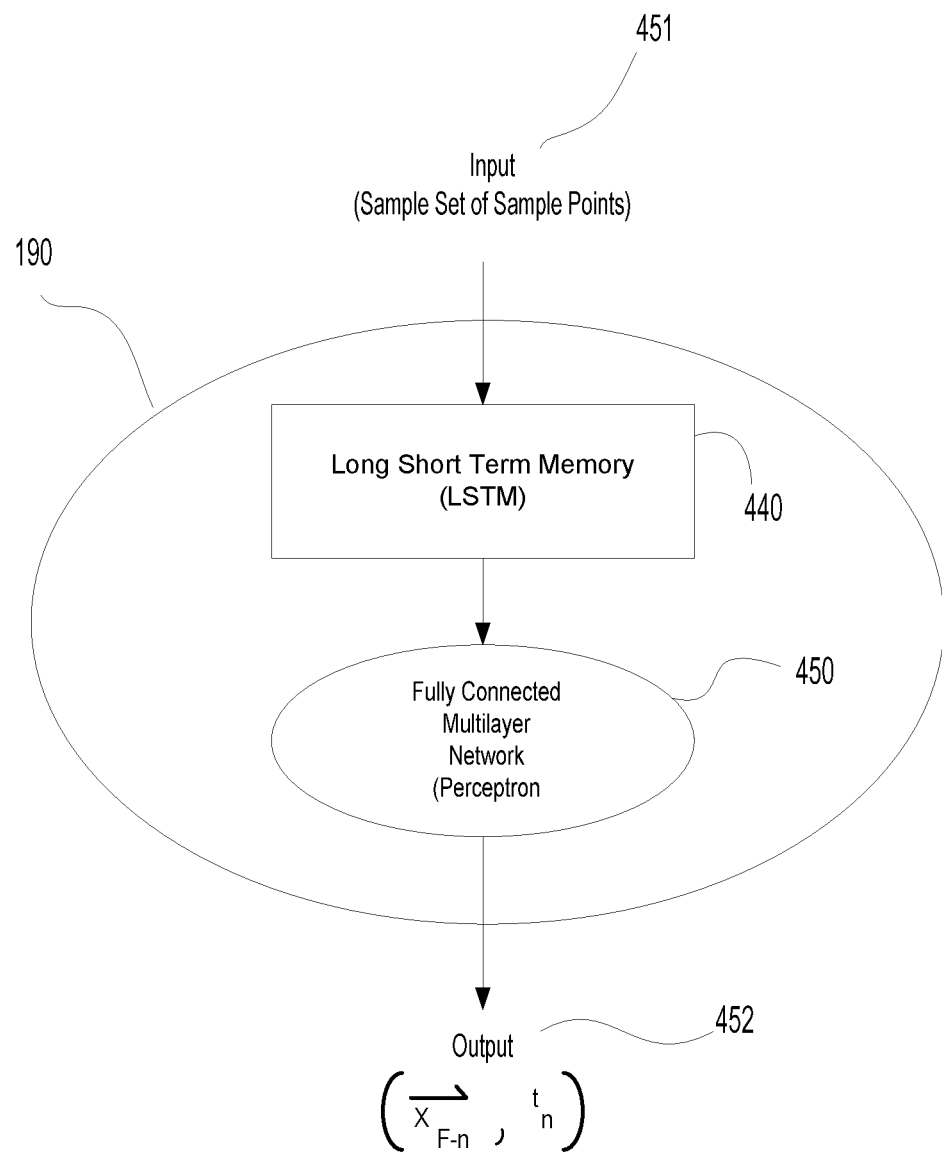
FIG. 4B illustrates a recurrent neural network used for predicting a landing point of a saccade associated with a user viewing a display of an HMD, in accordance with one embodiment of the present disclosure.

Once the eye and/or eye movement is determined to be in a saccade, the prediction engine 400 is configured to determine the landing point on the display towards which the gaze direction of the user is pointing. That is, at a particular point (e.g., midpoint, end, etc.) during the saccade, the landing point can be determined by prediction engine 400, and more particularly by the deep learning engine 190, as is shown in FIG. 4B. In particular, the sample set collector 430 collects information from a set of sample points, to include information from the current sample point 402. Velocity information determined from the set of sample points may be further determined, such that at least a segment of a full velocity graph may be generated for the saccade that is experienced by the user. The information, including the segment of the velocity graph, is provided as input to a deep learning engine 190 to determine the landing point.

For example, FIG. 4B illustrates a recurrent neural network as the deep learning engine 190 that is used for predicting a landing point of a saccade associated with a user viewing a display of an HMD, in accordance with one embodiment of the present disclosure. The recurrent neural network includes a long short term memory (LSTM) module 440 and a fully connected multilayer network 450 (e.g., a multilayer perceptron). In particular, the deep learning engine 190 is configured to compare the input information 451 (e.g., segment of velocity graph, etc.) to models of saccades generated and/or known by the deep learning engine 190. For example, the segment of the saccade being analyzed is compared to velocity graphs built from the plurality of saccades of test subjects. In other embodiments, the input to the neural network may include information in addition to velocity, such as the velocity at each sample point, gaze direction at each sample point, and time at each of the sample points. In that manner, a landing point on the display corresponding to the direction of the eye of the user may be determined for any point during the saccade based on the saccade models built and/or known by the deep learning engine 190. As shown, the output 452 of the deep learning engine 190 includes a vector ($X_{F-n}$) that indicates a gaze direction of the user that is pointed to the determined landing point. Optionally, a time ($t_n$) parameter that predicts when the eye of the user is directed towards the landing point. The time ($t_n$) parameter may be referenced to one or more points, such as the beginning of the saccade, the point at which the saccade is determined, the most current sample point in the sample set of sample points 451, etc.

Figure 4C:
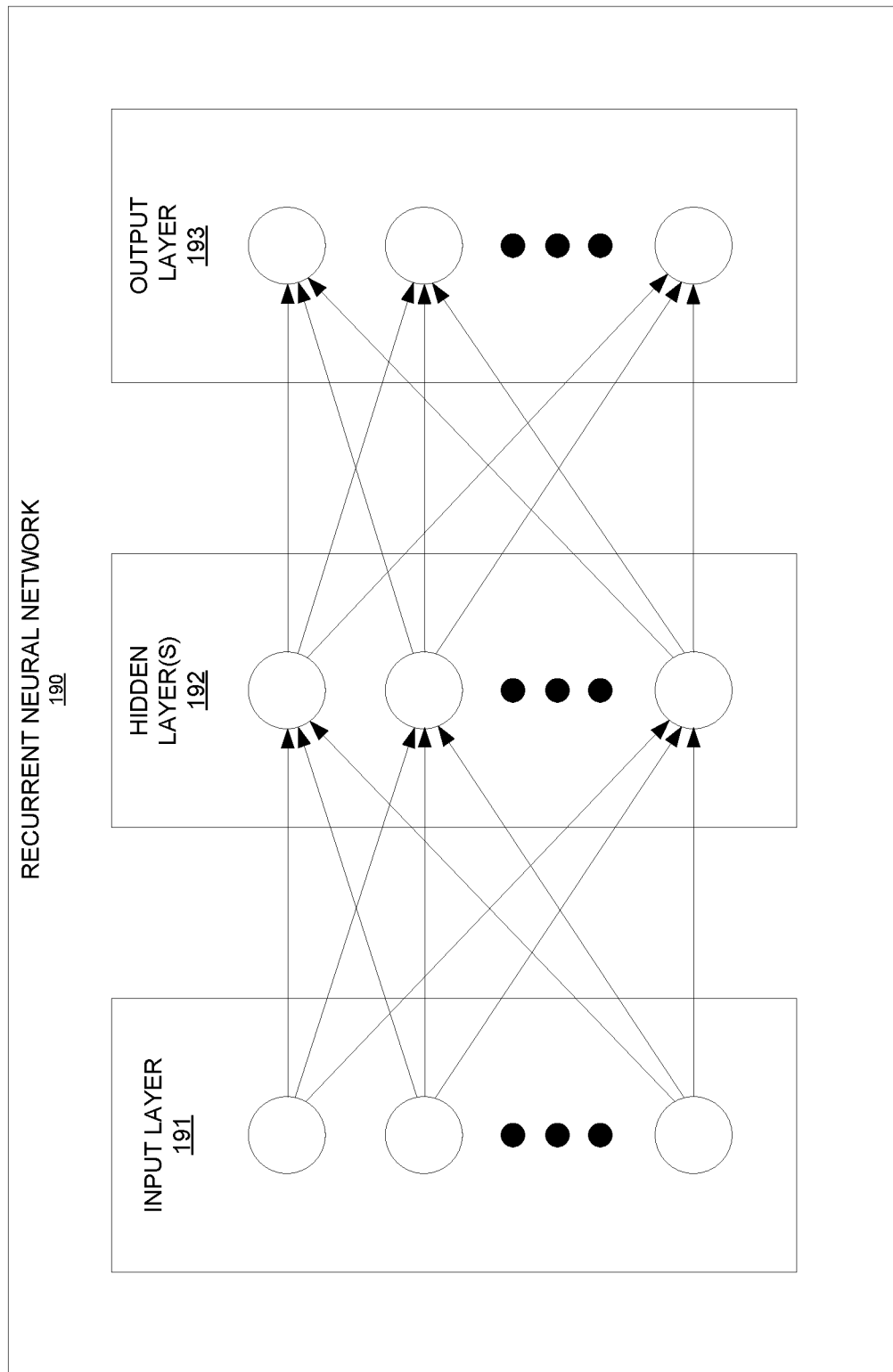
FIG. 4C illustrates an example neural network used for building models of saccade movement for one or more users viewing VR scenes in an HMD, in accordance with one embodiment of the present disclosure.

FIG. 4C illustrates an example neural network used to build saccade models and or velocity graphs for those saccade models based on measured saccades of test subjects, and to perform prediction of a landing point on a display of an HMD, for example, wherein the landing point is associated with the gaze direction of any eye of a user during and/or at the end of a saccade that is defined in association with the user viewing a display (e.g., of an HMD), in accordance with one embodiment of the present disclosure. Specifically, the deep learning or machine learning engine 190 in the saccade prediction engine 400 is configured to receive as input information related to eye orientation data of a user (e.g., gaze direction, time, segment of velocity graph of a saccade, etc.). The deep learning engine 190 utilizes artificial intelligence, including deep learning algorithms, reinforcement learning, or other artificial intelligence-based algorithms to build saccade models, such as velocity graphs for those saccade models, as previously described, to recognize a saccade currently being experienced by a user and predict where the gaze direction is pointing towards at any point during the saccade.

That is, during learning and/or modeling phases, input data (e.g., measurements of saccades of test subjects) is used by the deep learning engine 190 to create saccade models (including the velocity graphs for those saccade models) that can be used to predict a landing point of a display towards which the eye(s) of a user is pointing. For example, the input data may include multiple measurements of saccades of test subjects, which when fed into a deep learning engine 190 is configured to create one or more saccade models, and for each saccade model a saccade recognition algorithm that can be used to identify when a current saccade matches that saccade model.

In particular, neural network 190 represents an example of an automated analysis tool for analyzing data sets to determine the responses, actions, behavior, wants and/or needs of a corresponding user. Different types of neural networks 190 are possible. In an example, the neural network 190 supports deep learning. Accordingly, a deep neural network, a convolutional deep neural network, and/or a recurrent neural network using supervised or unsupervised training can be implemented. In another example, the neural network 190 includes a deep learning network that supports reinforcement learning. For instance, the neural network 190 is set up as a Markov decision process (MDP) that supports a reinforcement learning algorithm.

Generally, the neural network 190 represents a network of interconnected nodes, such as an artificial neural network. Each node learns some information from data. Knowledge can be exchanged between the nodes through the interconnections. Input to the neural network 190 activates a set of nodes. In turn, this set of nodes activates other nodes, thereby propagating knowledge about the input. This activation process is repeated across other nodes until an output is provided.

As illustrated, the neural network 190 includes a hierarchy of nodes. At the lowest hierarchy level, an input layer 191 exists. The input layer 191 includes a set of input nodes. For example, each of these input nodes is mapped to local data 115 collected actively through actuators or passively by sensors during monitoring of a test user/subject (e.g., eye orientation data) that is undergoing a corresponding saccade.

At the highest hierarchical level, an output layer 193 exists. The output layer 193 includes a set of output nodes. An output node represents a decision (e.g., prediction) that relates to information of a currently experienced saccade. As previously described, the output nodes may match the saccade experienced by a user to a previously modeled saccade, and further identify a predicted landing point of a display (e.g., of an HMD) towards which a gaze direction of a user is pointed during and/or at the end of the saccade.

These results can be compared to predetermined and true results obtained from previous interactions and monitoring of test subjects in order to refine and/or modify the parameters used by the deep learning engine 190 to iteratively determine the appropriate saccade models and predicted landing points of a display corresponding to a gaze direction of a user during and/or at the end of a saccade for a given set of inputs. That is, the nodes in the neural network 190 learn the parameters of the saccade models that can be used to make such decisions when refining the parameters.

In particular, a hidden layer 192 exists between the input layer 191 and the output layer 193. The hidden layer 192 includes "N" number of hidden layers, where "N" is an integer greater than or equal to one. In turn, each of the hidden layers also includes a set of hidden nodes. The input nodes are interconnected to the hidden nodes. Likewise, the hidden nodes are interconnected to the output nodes, such that the input nodes are not directly interconnected to the output nodes. If multiple hidden layers exist, the input nodes are interconnected to the hidden nodes of the lowest hidden layer. In turn, these hidden nodes are interconnected to the hidden nodes of the next hidden layer, and so on and so forth. The hidden nodes of the next highest hidden layer are interconnected to the output nodes. An interconnection connects two nodes. The interconnection has a numerical weight that can be learned, rendering the neural network 190 adaptive to inputs and capable of learning.

Generally, the hidden layer 192 allows knowledge about the input nodes to be shared among all the tasks corresponding to the output nodes. To do so, a transformation $f$ is applied to the input nodes through the hidden layer 192, in one implementation. In an example, the transformation $f$ is non-linear. Different non-linear transformations $f$ are available including, for instance, a linear rectifier function $f(x) = \max(0,x)$.

The neural network 190 also uses a cost function c to find an optimal solution. The cost function measures the deviation between the prediction that is output by the neural network 190 defined as $f(x)$, for a given input x and the ground truth or target value y (e.g., the expected result). The optimal solution represents a situation where no solution has a cost lower than the cost of the optimal solution. An example of a cost function is the mean squared error between the prediction and the ground truth, for data where such ground truth labels are available. During the learning process, the neural network 190 can use back-propagation algorithms to employ different optimization methods to learn model parameters (e.g., the weights for the interconnections between nodes in the hidden layers 192) that minimize the cost function. An example of such an optimization method is stochastic gradient descent.

In an example, the training dataset for the neural network 190 can be from a same data domain. For instance, the neural network 190 is trained for learning the patterns and/or characteristics of similar saccades of test subjects based on a given set of inputs or input data. For example, the data domain includes eye orientation data. In another example, the training dataset is from different data domains to include input data other than a baseline. As such, the neural network 190 may recognize a saccade using eye orientation data, or may be configured to generate a saccade model for a given saccade based on eye orientation data.

Figure 5A:
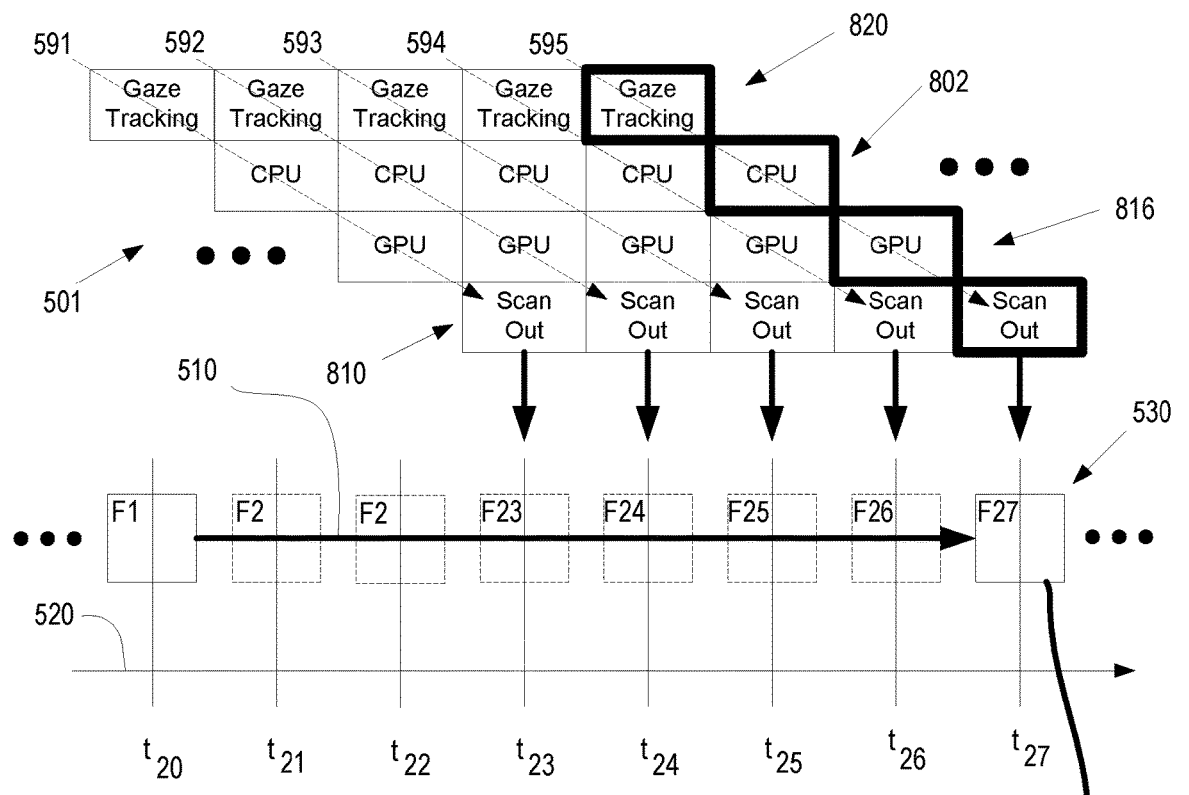
FIG. 5A illustrates a rendering pipeline without saccade prediction that shows how frame updating is slower than the eye movement such that after completing the eye movement the image is blurry to the user, in accordance with one embodiment of the present disclosure.
Figure 5A:
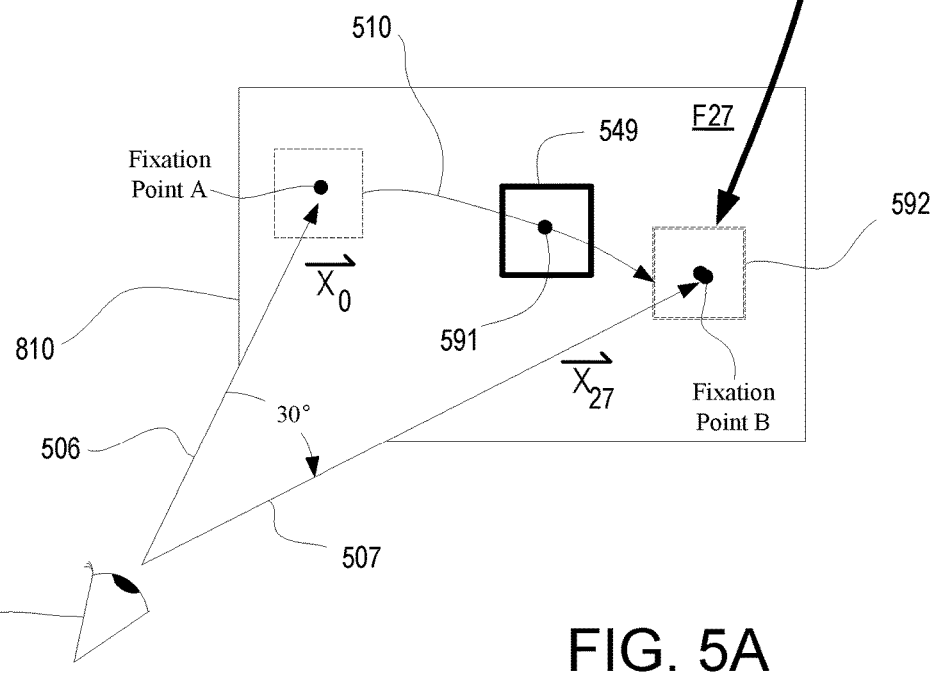

FIG. 5A illustrates a rendering pipeline 501 without saccade prediction that shows how frame updating is slower than the eye movement such that after completing the eye movement the image is blurry to the user, in accordance with one embodiment of the present disclosure. The rendering pipeline 501 may be implemented within HMD 102, computer 106, and cloud gaming server 114, alone or in combination, as previously described.

Figure 5B:
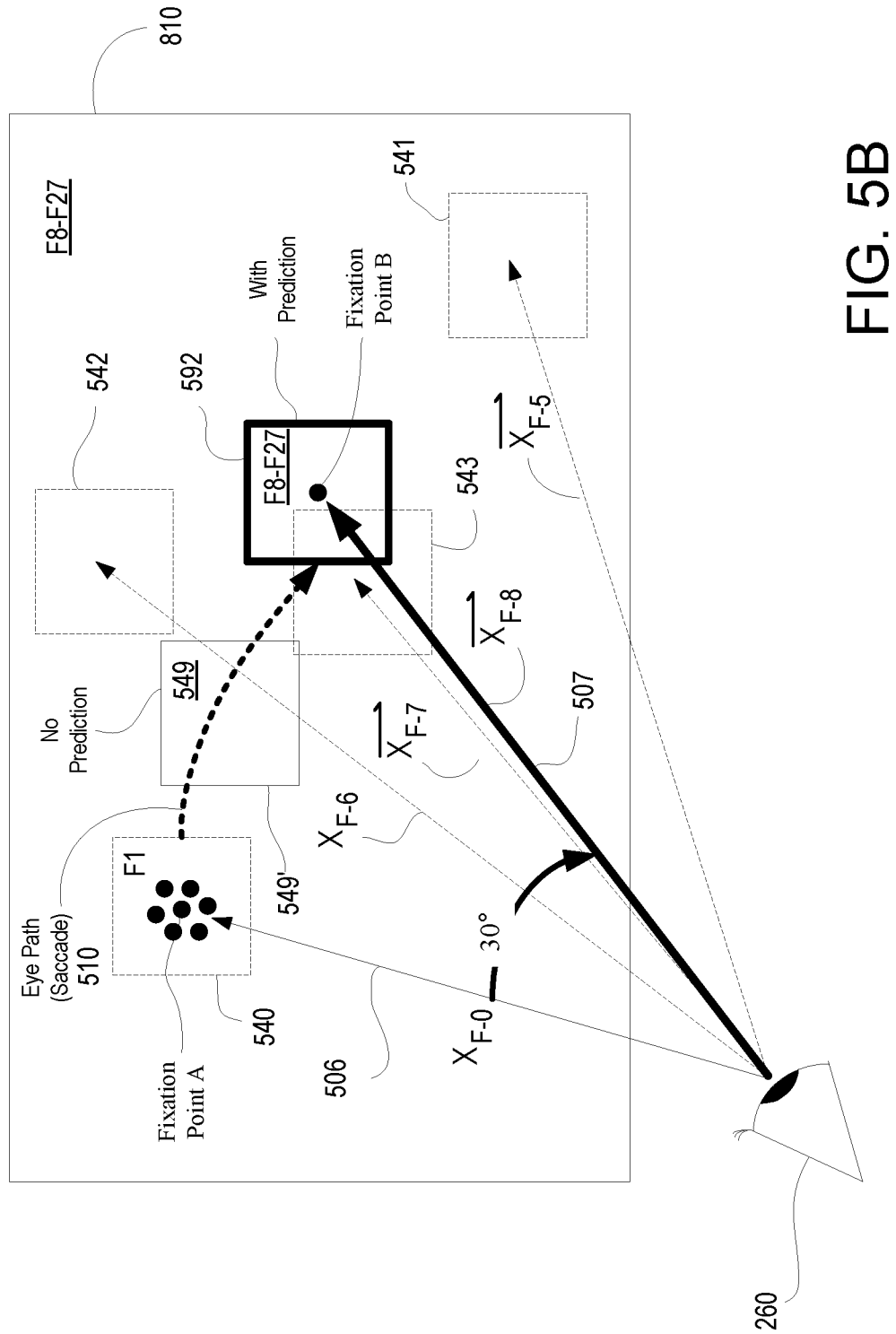
FIG. 5B illustrates the resulting effect of a rendering pipeline that is configured with saccade prediction of eye movement of a user viewing a display of an HMD, such that after completing the eye movement the image is in focus to the user by advancing the updating of the foveal region of high resolution in the rendering pipeline, in accordance with one embodiment of the present disclosure.

Although the rendering pipeline 501 is shown in FIG. 5A with landing point prediction not enabled, it is understood that in embodiments of the present disclosure, the rendering pipeline 501 may be optimized to analyze gaze tracking information in order to identify saccade and eye movement, and to predict a landing point (e.g., turned ON) on a display (e.g., of an HMD 102) towards which gaze direction of the eye(s) 260 of a user is pointed during and/or at the end of a saccade, as is shown in FIG. 5B. That is, in FIG. 5B, the rendering pipeline 501 may be configured to performed foveated rendering based on prediction of a landing point, as will be further described below in relation to FIG. 5B.

In particular, the rendering pipeline includes a central processing unit (CPU) 802, a graphics processing unit (GPU) 816 and memory that is accessible to both (e.g., vertex buffers, index buffers, depth or Z buffers, frame buffers for storing rendered frames to be delivered to a display, etc.). The rendering pipeline (or graphics pipeline) is illustrative of the general process for rendering images, such as when using 3D (three dimensional) polygon rendering processes. For example, the rendering pipeline 501 for a rendered image outputs corresponding color information for each of the pixels in a display, wherein the color information may represent texture and shading (e.g., color, shadowing, etc.).

The CPU 802 may be generally configured to perform object animation. CPU 802 receives input geometries corresponding to objects within a 3D virtual environment. The input geometries could be represented as vertices within the 3D virtual environment, and information corresponding to each of the vertices. For example, objects within the 3D virtual environment can be represented as polygons (e.g., triangles) defined by vertices, wherein the surface of a corresponding polygon is then processed through the rendering pipeline 501 to achieve a final effect (e.g., color, texture, etc.). The operations of the CPU 802 are well known, and are generally described herein. Generally, CPU 802 implements one or more shaders (e.g., compute, vertex, etc.) to perform object animation from frame-to-frame depending on the forces exerted on and/or applied by the object (e.g., external forces such as gravity, and internal forces of the object inducing movement). For example, the CPU 802 performs physics simulations of the objects, and/or other functions, in the 3D virtual environment. The CPU 802 then issues a draw command for the polygon vertices that is performed by the GPU 816.

In particular, the animation results generated by the CPU 802 may be stored to a vertex buffer, which is then accessed by the GPU 816 which is configured to perform a projection of the polygon vertices onto a display (e.g., of the HMD) and tessellation of the projected polygons for purposes of rendering the polygon vertices. That is, the GPU 816 may be configured to further build up the polygons and/or primitives that make up the objects within the 3D virtual environment, to include performing lighting, shadowing, and shading calculations for the polygons, which is dependent on the lighting for the scene. Additional operations may be performed, such as clipping to identity and disregard primitives outside of a viewing frustum, and rasterization for projecting objects in the scene onto the display (e.g., project objects to an image plane associated with a point-of-view of the user). At a simplistic level, rasterization includes looking at each primitive, and determining which pixels are affected by that primitive. Fragmentation of the primitives may be used to break a primitive to pixel sized fragments, wherein each fragment corresponds to a pixel in the display and/or a reference plane associated with the rendering point-of-view. One or more fragments of one or more primitives may contribute to a color of a pixel when rendering a frame on a display. For example, for a given pixel fragments of all primitives in the 3D virtual environment are combined into the pixel for the display. That is, overall texture and shading information for a corresponding pixel are combined to output a final color value for the pixel. These color values may be stored in a frame buffer, which are scanned to the corresponding pixels when displaying a corresponding image of a scene on a frame-by-frame basis.

The rendering pipeline 501 may include a gaze tracking system 820, which is configured to provide gaze direction and/or orientation information to the CPU 802. This gaze direction information may be used for purposes of performing foveated rendering, wherein a foveal region is rendered at high resolution and corresponds to a direction to which the user is gazing. FIG. 5A illustrates a rendering pipeline 501 that is configured for foveated rendering, but without saccade prediction (i.e., saccade prediction is turned off). That is, no landing point prediction is performed, and as a result the frames displayed on the HMD have foveal regions that do not coincide with the eye movement of the user because each calculated foveal region is stale when displayed, especially when the eye is moving. In addition, FIG. 5A shows a timeline 520 indicating the times that frames in a sequence (e.g., F1-F8) are scanned out from the rendering pipeline 501. The sequence of frames F1-F8 also is part of a saccade of a user viewing a display.

As shown in FIG. 5A, a rendering pipeline is shown to include operations performed in sequence by a gaze tracking system 820, CPU 802, GPU 816, and a raster engine for scanning out the rendered frames to a display 810. For illustration, rendering pipeline sequences 591-595 are shown. Because of space constraints, other pipeline sequences are not shown, such as the sequences for frames F3 through F-22. In the example shown in FIG. 5A, each of the components of the rendering pipeline 501 operate in the same frequency. For example, the gaze tracking system 820 may be outputting gaze direction and/or orientation information at 120 Hz, which may be the same frequency that the rendering pipeline of the CPU 802 and GPU 816 use. As such, gaze direction for a user's eye(s) 260 may be updated for each frame that is scanned out in the rendering pipeline. In other embodiments, the gaze tracking system 820 is not operating at the same frequency, such that gaze direction information may not align with the rendered frames being scanned out. In that case, the gaze direction information may add further delay if the frequency of the gaze tracking system 820 is slower than the frequency used by the CPU 802 and GPU 816.

The gaze tracking information may be used to determine a foveal region that is rendered in high resolution. Areas outside the foveal region are displayed at lower resolution. However, as shown in FIG. 5A, without saccade prediction, by the time the gaze tracking information is used to determine a frame to scan out, at least 2 frame periods, and up to three frame periods, have passed before the corresponding frame using the gaze tracking information is displayed. For example, in rendering pipeline sequence 591 gaze tracking information is determined in a first frame period at time t-20 (midpoint of saccade), and is delivered to the CPU 802. In the second frame period at time t-21, the CPU 802 performs physics simulation on objects, and delivers polygon primitives to the GPU 816 along with a draw instruction. In the third frame period at time t-23, the GPU performs primitive assembly to generate a rendered frame (F23). In addition, the GPU may render a foveal region that corresponds to the gaze direction delivered in the first frame period at time t-20, which was determined at least 2 frame periods previously. The frame F23, including the foveal region is scanned out in the fourth frame period at time t-23. Of note, in rendering pipeline sequence 591 the gaze tracking information determined at time t-20 is stale by at least frame periods at t-21 and t-22 (two frame periods), and possibly a portion of a third frame period. Similarly, pipeline sequence 592 scans out frame F24 at time t-24, with a foveal region defined back in the first frame period at time t-21. Also, pipeline sequence 593 scans out frame F25 at time t-25, with a foveal region defined back in the first frame period at time t-22. Further, pipeline sequence 594 scans out frame F26 at time t-26, with a foveal region defined back in the first frame period at time t-23. And, pipeline sequence 595 scans out frame F27 at time t-27, with a foveal region defined back in the first frame period at time t-24.

Because the eye 260 continually moves past the point (e.g., time) of being detected for each rendering pipeline (e.g., at the beginning of rendering pipeline sequences 591, or 592, or 593, etc.), the foveal region in a frame (e.g., frame F27) of a corresponding rendering pipeline sequence (e.g., sequence 595) as scanned may be stale by at least 2-3 frame periods. For example, the rendered frame F27 at scan out will have a foveal region that does not coincide with the gaze direction of the user. In particular, display 810 is shown showing frame F27 at time t-27, wherein the saccade path 510 (between frames F0 and F27) is superimposed onto display 810 and shows fixation point A (e.g., direction 506 and vector XF-$_0$), which corresponds to the beginning of the saccade. For illustration, frame F1 was scanned out at the beginning of the saccade path 510 at time t-0, with the foveal region centered at fixation point A. The saccade path 510 includes fixation point B, which corresponds to the end of the saccade, or at least a second point of the saccade. For illustration, frame F27 is scanned out at the end of the saccade path 510 at time t-27.

Again, because there is no prediction of the saccade path performed by the rendering pipeline 501, the gaze direction information provided by the gaze tracking system 820 is stale by at least two or three frame periods. As such, when frame F27 is being scanned out for rendering pipeline sequence 595 at time t-27, although the eye 260 is fixated on fixation point B (with eye direction 507 and vector $X_{F-27}$), the rendering pipeline sequence 595 uses the gaze direction information provided at time t-24, which is stale. That is, gaze direction information determined at time t-24 is propagated through rendering pipeline sequence 595 to scan out at time t-27. In particular, the gaze tracking system 820 at time t-24 noted a gaze direction pointed at point 591 on display 810. As such, at time t-24, when the frame F24 is being scanned out, the eye 260 of the user is directed towards point 591 of the display. Whether the foveal region of frame F24 as rendered is correctly located on display 810 may be inconsequential, as during the saccade, the images received by the eye 260 are not fully processed, and may appear blurry to the viewer. However, when frame F27 is scanned out on display 810 at time t-27, the eye of the user is directed at fixation point B (as shown by dotted region 592), even though the rendered foveal region 549 is calculated to be around point 591 at time t-24. As such, to the user whose eye 260 is directed to and focused on region 592 at time t-27, the frame F27 appears blurry because region 592 is calculated to be in the periphery and may be rendered at lower resolution, whereas the stale foveal region 549 (to which the eye is not directed) is rendered at high resolution, as previously described.

FIG. 5B illustrates the resulting effect of a rendering pipeline that is configured with saccade prediction of eye movement of a user viewing a display of an HMD, such that after completing the eye movement the image is in focus to the user by advancing the updating of the foveal region of high resolution in the rendering pipeline, in accordance with one embodiment of the present disclosure. For example, the rendering pipeline 501 shown in FIG. 5A is now enabled with saccade prediction, and more specifically with landing point prediction. That is, the rendering pipeline 501 is now optimized to analyze gaze tracking information in order to identify saccade and eye movement, and to predict a landing point (e.g., turned ON) on a display (e.g., of an HMD 102) towards which gaze direction of the eye(s) 260 of a user is pointed during and/or at the end of a saccade. As such, in FIG. 5B, the rendering pipeline 501 is now configured to performed foveated rendering based on prediction of a landing point. For purposes of illustration only, FIG. 5B illustrates the prediction of a landing point at the end of the saccade 510 in one embodiment, although in other embodiments a prediction of a landing point during a saccade is possible (e.g., predicting a landing point 3-5 frame periods beyond a current sample point).

In particular, display 810 is shown presenting frame F27 at time t-27. The saccade path 510 is superimposed onto display 810 and shows fixation point A (e.g., direction 506 and vector $X_{F-0}$), which corresponds to the beginning of the saccade. For illustration, frame F1 was scanned out at the beginning of the saccade path 510 at time t-0, with the foveal region centered at fixation point A. The saccade path 510 includes fixation point B, which corresponds to the end of the saccade, or at least a second point of the saccade. For illustration, frame F27 is scanned out at the end of the saccade path 510 at time t-27.

As each frame is scanned out, saccade prediction is performed within the rendering pipeline 501. In one embodiment, the saccade prediction and/or landing point prediction can be performed within the CPU 802, GPU 816, or a combination of both. In another embodiment, the saccade prediction is performed remotely and delivered as an input into the rendering pipeline 501. Once prediction is performed, the GPU 816 can render the frame with a foveal region based on the landing point prediction. In particular, the GPU 816 can modify the foveated rendering, such that instead of relying on stale gaze direction information as previously described in FIG. 5A, a predicted landing point is used to determine the location of the foveal region.

In particular, predicted landing points for fixation point B are superimposed onto display 810. These landing points were determined in previous rendering pipeline sequences. In particular, by the time frame F8 and subsequent frames are scanned out, the predicted landing point for the saccade has converged to fixation point B, for example. As shown, at some point after a saccade is detected (e.g., during scan out of frame F5 at time t-5), prediction is performed. For example, prediction may be performed beginning with the rendering of frame F5 and subsequent frames. The saccade 510 was previously introduced in FIG. 5A and includes fixation point A as a starting point, and fixation point B (e.g., as an end point, or a predefined point within the saccade—such as 3-5 frame periods in the future).

As frame F5 is scanned out, a predicted landing point (e.g., centered at vector $X_{F-5}$) is shown as predicted foveal region 541, which is off from the fixation point B. With the next rendering pipeline sequence, as frame F6 is scanned out, a predicted landing point (e.g., centered at vector $X_{F-6}$) is shown as predicted foveal region 542, which is closer but still off from fixation point B. Because the prediction converges, in the next rendering pipeline sequence, as frame F7 is scanned out, a predicted landing point (centered at vector $X_{F-7}$) is shown as predicted foveal region 543, which is very close to fixation point B. Convergence may appear in the next rendering pipeline sequence as frame F8 is scanned out, wherein the predicted landing point (e.g., centered at vector $X_{F-8}$) is shown as predicted foveal region 592 (bolded), which is centered about the fixation point B. For any subsequent rendering pipeline sequence, the foveal region 592 is used for rendering and is centered about the fixation point B, such as when rendering and scanning out frames F9-F27 of saccade 510. In that manner, when frame F27 is rendered, because of landing point prediction to fixation point B, the foveal region 592 coincides with the movement of the eye(s) 260 of the user, such as at the end of the saccade. Also, because the prediction of the landing point converges with the rendering and scanning out of frame F8, all the frames F9-F27 may already have the foveal region 592 in preparation of the movement of the eye(s) of the user. As such, instead of rendering at foveal region 549 without prediction (as described in FIG. 5A), targeted landing points (e.g., a defined number of frame periods in the future, the end of the saccade, etc.) are updated using the predicted foveal region 592, such that when the eye reaches that predicted landing point, the frame is rendered with a foveal region centered about that predicted landing point.

Figure 6A:
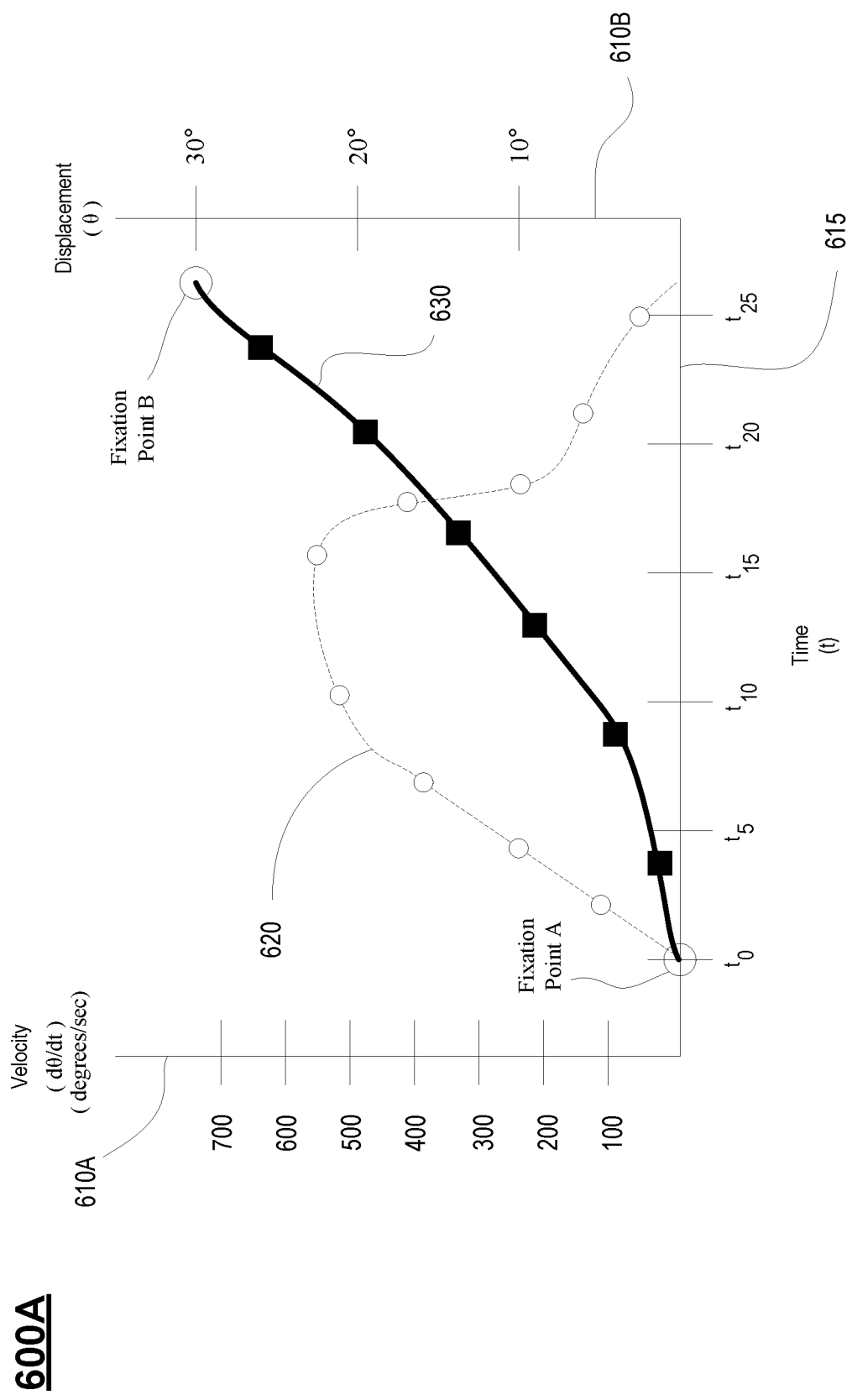
FIG. 6A illustrates eye displacement and velocity of a saccade of a user viewing a display of an HMD, in accordance with one embodiment of the present disclosure.

FIG. 6A illustrates a graph 600A showing eye displacement and velocity of a saccade of a user viewing a display of an HMD, in accordance with one embodiment of the present disclosure. Graph 600A includes a vertical axis 610A showing angular velocity (dθ/dt) of eye movement during a saccade. In addition, graph 600A includes another vertical axis 610B showing angular displacement (θ). Graph 600A includes a horizontal axis 615 showing time, and includes a time sequence for the saccade between times t-0 and approximately t-27 and/or t-28.

Purely for illustration, graph 600A shows the angular displacement of a saccade in line 630. As previously introduced, a saccade defines a quick and simultaneous movement of the eye(s) of a user made when traversing from one fixation point on a display to another fixation point. As shown, the angular movement as shown by displacement line 630 of the eye is in a particular direction (e.g., from left to right). That is, during the saccade the gaze direction of the eye moves between 0 degrees to 30 degrees, in the example of graph 600A.

Correspondingly, purely for illustration, graph 600A shows the velocity of the eye during a saccade in line 620. The velocity graphs of different saccades generally follow the same shape shown in line 620. For example, at the start of the saccade, the velocity of the saccade follows a linear progression (e.g., between times t-0 and t-8). After the linear progression, the velocity may plateau, such as between times t-8 and t-17. The velocity graph in line 620 shows a steep drop in velocity after the plateau till the end of the saccade, such as between times t-17 and t-27.

Embodiments of the present disclosure match a segment of a velocity graph (e.g., the linear portion of the line 620) of a current saccade to a modeled saccade (e.g., built when training a deep learning engine 190). The landing point of the current saccade may approximate the landing point of the modeled saccade at any point during the saccade, and can be predicted for the current saccade.

Figure 6B:
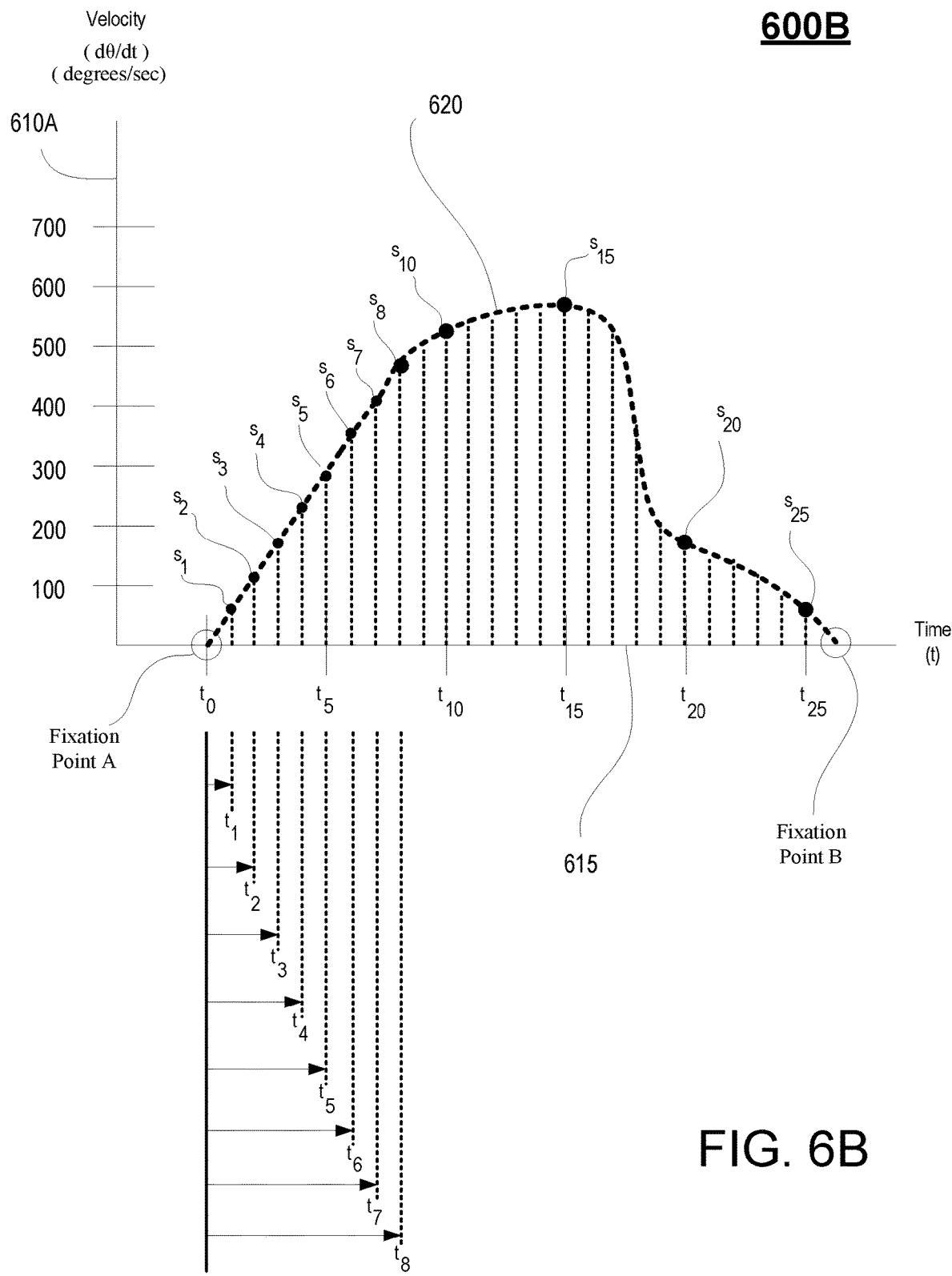
FIG. 6B illustrates the sampling of eye orientation data at various sample points in a velocity graph of a saccade of a user viewing a display of an HMD, in accordance with one embodiment of the present disclosure.

FIG. 6B illustrates the sampling of eye orientation/tracking data at various sample points in a velocity graph 600B of a saccade of a user viewing a display of an HMD, in accordance with one embodiment of the present disclosure. Graph 600B follows graph 600A of FIG. 6A to include vertical axis 610A showing angular velocity (dθ/dt) of eye movement during a saccade, and a horizontal axis 615, but is isolated to show only the velocity of the saccade in line 620.

In particular, at various sample points during the saccade, eye orientation/tracking data is collected from gaze tracking system 820. For illustration purposes only, the sample points may occur at least at times t-0, t-1, t-2 ... t-27 ... t-n. For example, sample point $S_1$ online 620 shows is associated with eye tracking data (e.g., gaze direction, velocity, etc.) for time t-1, sample point $S_2$ is associated with eye tracking data for time t-2, sample point $S_3$ is associated with eye orientation/tracking data for time t-4, sample point $S_5$ is associated with eye tracking data for time t-5, sample point $S_6$ is associated with eye tracking data for time t-6, sample point $S_7$ is associated with eye tracking data for time t-7, sample point $S_8$ is associated with eye tracking data for time t-8, etc. As an example, data collected at each sample point may include gaze direction, time, and other information, as previously described. Based on the data, velocity information for the eye(s) of the user may be determined. In some embodiments, velocity data may be directly collected from the gaze tracking system 820.

As such, during the saccade indicated by velocity line 620 eye tracking data is collected and/or determined for at least sample points $S_1$ through approximately $S_{27}$. Sample points $S_1$ through $S_8$ are highlighted in graph 600B to show convergence of the prediction of a landing point for the saccade (e.g., end of the saccade 510), as previously indicated in FIG. 5B, which shows convergence approximately at time t-8 corresponding to sample point $S_8$.

Figure 6C:
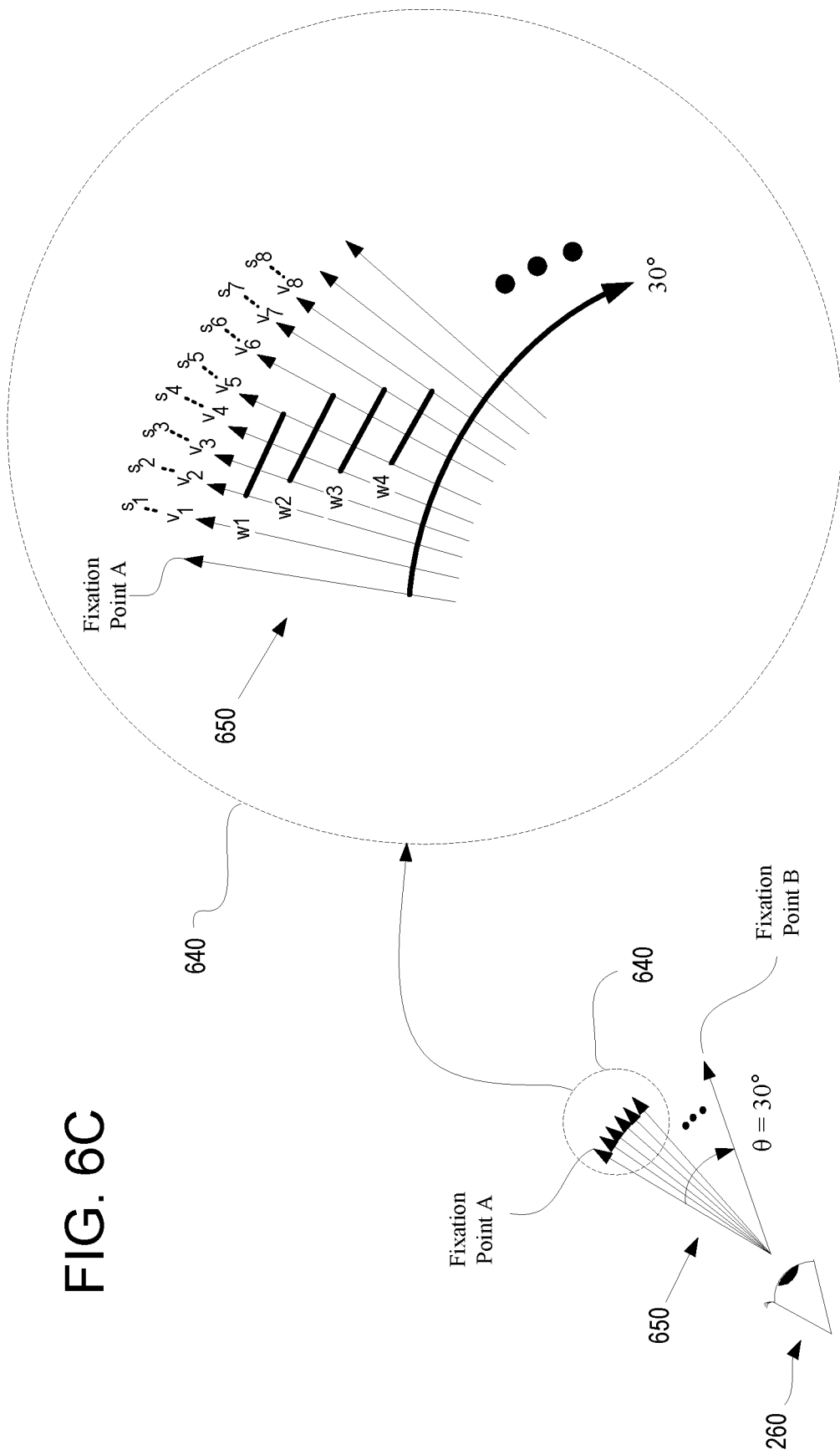
FIG. 6C illustrates the collection of eye orientation data for one or more sets of sample points that are used for predicting a landing point of a saccade associated with a user viewing a display of an HMD, in accordance with one embodiment of the present disclosure.

FIG. 6C illustrates the collection of eye orientation/tracking data for one or more sets of sample points that are used for predicting a landing point of a saccade associated with the eye(s) 260 of a user viewing a display of an HMD, in accordance with one embodiment of the present disclosure. FIG. 6C shows the use of information at sample points introduced in graph 600B of FIG. 6B to predict a landing point of a saccade of the eye(s) of the user.

As shown, eye orientation/tracking data is collected by a gaze tracking system 820 on eye 260 at a plurality of sample points 650 (e.g., $S_1$ through $S_{27}$ at each of times t-1 through t-27). Purely for illustration purposes only, the saccade is shown traveling between 0 to 30 degrees between fixation point A and fixation point B.

In particular, velocity data is collected and/or determined from the eye orientation/tracking data for each of the sample points 650. A circle 640 highlighting sample points is shown enlarged, and includes at least sample points $S_1$ through $S_8$. For example, velocity data $V_1$ is associated with sample point $S_1$, velocity data $V_2$ is associated with sample point $S_2$, velocity data $V_3$ is associated with sample point $S_3$, velocity data $V_4$ is associated with sample point $S_4$, velocity data $V_5$ is associated with sample point $S_5$, velocity data $V_6$ is associated with sample point $S_6$, velocity data $V_7$ is associated with sample point $S_7$, and at least velocity data $V_8$ is associated with sample point $S_8$. Additional data is collected and/or determined for remaining sample points, but are not shown in circle 640.

For prediction purposes, once the eye(s) of the user is identified as being in a saccade, information form sets of sample points is collected. For purposes of illustration, saccade identification may occur at time t-5 associated with sample point $S_5$, which also coincides with the beginning of rendering of a future frame F8. In one embodiment, saccade identification is confirmed once the velocity of the eye(s) meets and/or exceeds a threshold velocity.

After saccade identification, prediction of a predefined landing point is performed. Specifically, information from a set of sample points is identified. At least, the information includes angular velocity that is measured and/or calculated. The set may contain a predefined number of sample points, including the current sample point. For example, the set may contain 1-10 sample points. In one embodiment, the set may contain between 3-5 sample points to reduce error.

For purposes of illustration, the set may contain 4 sample points, including the current sample point, as is described in FIG. 6C. A sliding window is shown collecting information from sets of sample points. For example, at the frame period or time corresponding to current sample point $S_5$, the window (w1) includes sample points $S_2$ through $S_5$, wherein respective information (e.g., velocity) from those sample points are used to predict a landing point. At the next frame period or time corresponding to the next current sample point $S_6$, window (w2) includes sample points $S_3$ through $S_6$, wherein respective information is used to predict an updated landing point. Again, at the next frame period or time corresponding to the next current sample point $S_7$, window (w3) includes sample points $S_4$ through $S_7$, wherein respective information is used to predict an updated landing point. Convergence may occur at the next frame period or time corresponding to the next current sample point $S_8$, wherein window (w4) includes sample points $S_5$ through $S_8$.

Convergence was previously described in relation to FIG. 5B. Confirmation of the convergence may occur with subsequent predictions of the landing point, such as for windows w5 ... w27. In one embodiment, once convergence is confirmed, prediction may be disabled.

Figure 6D:
FIG. 6D illustrates a table listing the eye orientation data for sets of sample points that are used for predicting a landing point of a saccade associated with a user viewing a display of an HMD, in accordance with one embodiment of the present disclosure.

FIG. 6D illustrates a table 600D listing the eye orientation data for sets of sample points that are used for predicting a landing point of a saccade (e.g., end of a saccade) associated with a user viewing a display of an HMD, in accordance with one embodiment of the present disclosure. FIG. 6D is aligned with the FIG. 5B showing the prediction and convergence of the predicted landing point at fixation point B.

In particular, col. 661 shows the window designation (e.g., w1 through w5); col. 662 shows sets of sample points; col. 663 shows a predicted landing point coinciding with the end of the saccade, wherein the angular displacement is referenced to the start of the saccade at fixation point A; and col. 664 shows the predicted saccade end time (e.g., by frame or frame period), wherein the predicted end time is referenced to a start time of the saccade at fixation point A.

For example, window w1 predicts a landing point (end of saccade) using information (e.g., velocity) from a set of sample points including sample points $S_2$ though $S_5$. The predicted gaze direction of the eye(s) of the user for the predicted landing point is vector $X_{F-5}$, with an angle of 42 degrees. The predicted landing point is shown centered at fixation region 541 in FIG. 5B. In addition, the predicted end time or duration of the saccade is predicted to be approximately time t-38 associated with frame and/or frame period F38.

Also, window w2 predicts an updated landing point (end of saccade) using information (e.g., velocity) from a set of sample points including sample points $S_3$ though $S_6$. The predicted gaze direction of the eye(s) of the user for the predicted landing point is vector $X_{F-6}$, with an angle of 18 degrees. The predicted landing point is shown centered at fixation region 542 in FIG. 5B. In addition, the predicted end time or duration of the saccade is predicted to be approximately time t-20 associated with frame and/or frame period F20.

Window w3 predicts an updated landing point (end of saccade) using information (e.g., velocity) from a set of sample points including sample points $S_4$ though $S_7$. The predicted gaze direction of the eye(s) of the user for the predicted landing point is vector $X_{F-7}$, with an angle of 28 degrees, which is close to the fixation point B at an angle of 30 degrees. The predicted landing point is shown centered at fixation region 543 in FIG. 5B, which is close to fixation point B. In addition, the predicted end time or duration of the saccade is predicted to be approximately time t-25 associated with frame and/or frame period F25.

Windows w4 and w5 show convergence of the predicted landing point (e.g., end of the saccade). That is, the prediction associated with these windows show the landing point at 30 degrees (e.g., from fixation point A). For example, window (w4) predicts a landing point using sample points $S_5$ through $S_8$. The predicted gaze direction of the eye(s) of the user and predicted landing point is vector $X_{F-8}$, with an angle of 30 degrees, which is also the angle to fixation point B. The predicted end time or duration of the saccade is predicted to be approximately time t-27 associated with frame and/or frame period F27. Also, window (w5) uses sample points $S_6$ through $S_9$ to predict the same landing point of 30 degrees at fixation point B, with the same predicted end time or duration of the saccade at time t-27 associated with frame and/or frame period F27. As such, convergence occurs at window (w4) and confirmation of the convergence occurs at window (w5). Subsequent predictions should show the converged landing point.

Figure 7:
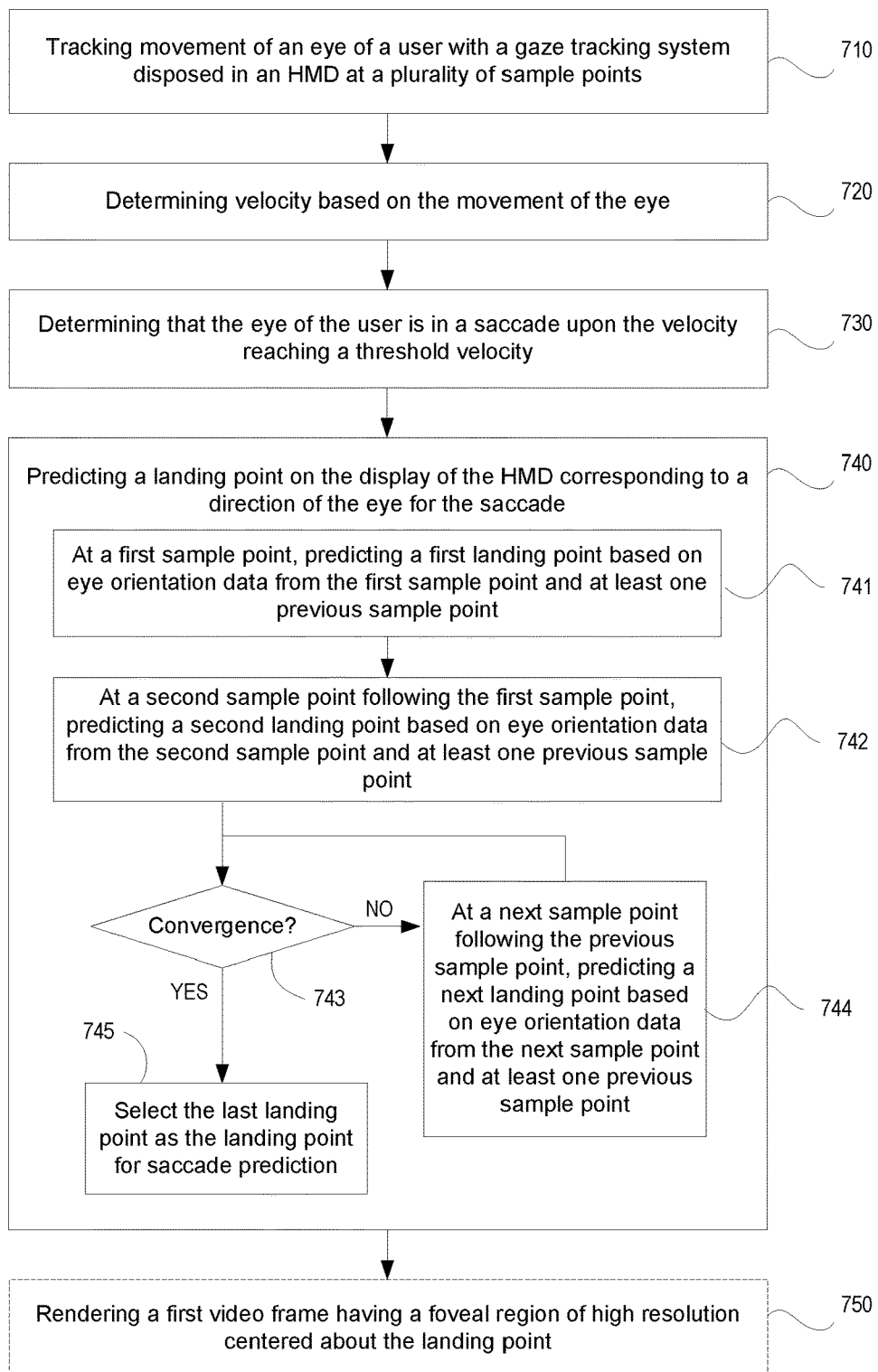
FIG. 7 is a flow diagram illustrating steps in a method for predicting a landing point of a saccade associated with a user viewing a display of an HMD, and includes the convergence of multiple predictions of a landing point of a saccade associated with a user viewing a display of an HMD using eye orientation data from sets of sample points collected during the saccade, in accordance with one embodiment of the present disclosure.

With the detailed description of the various modules of the gaming console, HMD, and cloud gaming server, a method for predicting a landing point on a display (e.g., of an HMD) associated with a gaze direction of eye(s) of a user experiencing a saccade, wherein the landing point may occur at any point during or at the end of the saccade, is now described in relation to flow diagram 700 of FIG. 7, in accordance with one embodiment of the present disclosure. As previously described, flow diagram 700 illustrates the process and data flow of operations involved for predicting a landing point at one or more of the HMD, gaming console, and cloud gaming server. In particular, the method of flow diagram 300 may be performed at least in part by the saccade prediction engine 400 of FIGS. 1A-1C, 2, and 4A-4C.

Figure 6E:
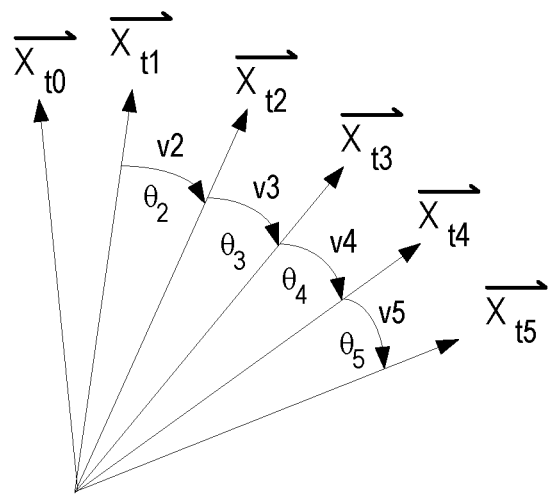
FIG. 6E shows gaze direction vectors used for determining velocity of the eye(s) of a user, in accordance with one embodiment of the present disclosure.

At 710, the method includes tracking movement of at least one eye of a user with a gaze tracking system disposed in the HMD at a plurality of sample points. For example, eye orientation/tracking data may be collected, to include at least gaze direction. For example, gaze direction may be shown in FIG. 6E at various times t0 through t5, in accordance with one embodiment of the present disclosure. In FIG. 6E, at time t0, the gaze direction is defined by vector $X_{t0}$; the gaze direction defined by vector $X_{t1}$ is at time t1; the gaze direction defined by vector $X_{t2}$ is at time t2; the gaze direction defined by vector $X_{t3}$ is at time t3; the gaze direction defined by vector $X_{t4}$ is at time t4; and the gaze direction defined by vector $X_{t5}$ is at time t5.

At 720, the method includes determining velocity of the movement based on the tracking. Gaze direction vectors as shown in FIG. 6E may be used for determining velocity of the eye(s) of a user. That is, a velocity of the eye(s) may be determined based on a first eye or gaze direction and a second eye or gaze direction from two sample points. In particular, the gaze directions between two sample points, the angle between the two gaze directions, and the time between the two sample points may be used to determine the velocity between the two sample points. For example, the angle (θ) between two sample points may be determined using one of numerous techniques, including the trigonometric function defined in the following equation. As an illustration, the angle (θ) is determined between two sample points taken at time $t_n$ and time $t_{n-1}$, using the following equation (1), in one embodiment. Referring to FIG. 6E, the angle $θ_2$ may be determined from the vectors $X_{t1}$ and $X_{t2}$, the angle $θ_3$ may be determined from the vectors $X_{t2}$ and $X_{t3}$, $θ_4$ may be determined from the vectors $X_{t3}$ and $X_{t4}$, and $θ_5$ may be determined from the vectors $X_{t4}$ and $X_{t5}$.

$$\theta = \arccos\left(\frac{\vec{x_{t-1}} \cdot \vec{x_t}}{|\vec{x_{t-1}}||\vec{x_t}|}\right) \quad (1)$$

Equation 1 gives the angle between the gaze directions at two sample points taken at time $t_n$ and time $t_{n-1}$. To compute the velocity occurring between the two sample points, the angle would be divided by Δt, the duration of time between the two sample points, as shown in equation (2), below.

$$\text{velocity (degrees per second)} = \theta/t_n - t_{n-1} \quad (2)$$

As such, velocity (v2) can be determined between sample points taken at times t1 and t2 using vectors $X_{t1}$ and $X_{t2}$, velocity (v3) can be determined between sample points taken at times t2 and t3 using vectors $X_{t2}$ and $X_{t3}$, velocity (v4) can be determined between sample points taken at times t3 and t4 using vectors $X_{t3}$ and $X_{t4}$, and velocity (v5) can be determined between sample points taken at times t4 and t5 using vectors $X_{t4}$ and $X_{t5}$.

At 730, the method includes determining that the eye of the user is in a saccade upon the velocity reaching a threshold velocity, in one embodiment. In other embodiment, other methods can be used to determine that the eye(s) of the user is in a saccade. As previously described, the threshold velocity is predefined to avoid identifying a saccade when the eye(s) may be experiencing another type of movement (e.g., smooth pursuit), or when the data is noisy.

At 740, the method includes predicting a landing point on the display of the HMD corresponding to a direction of the eye for the saccade. In one embodiment, the direction corresponds to the gaze direction of the eye. Since the gaze direction may be defined relative to the screen of the HMD, the gaze direction may be converted to a location on the screen, wherein the location is the landing point. The landing point may be used as the center of a foveal region rendered at high resolution for a frame. The landing point may occur at any point during the saccade, to include a mid-point of the saccade corresponding to an intermediate direction of the eye, in one embodiment. For example, the landing point may occur a predefined number of frame periods beyond the current frame period, in one embodiment. In another embodiment, the landing point may occur at the end of the saccade and corresponds to a fixation direction of the eye.

The prediction of a landing point may include collecting eye orientation/tracking data when tracking movement of the eye for a set of sample points. That is, information from the set of sample points is used to predict the landing point. The eye orientation/tracking data includes at least eye and/or gaze directions with respect to the HMD, wherein at least one sample point of the set occurs during the saccade. Velocity information may be determined from the eye orientation/tracking data, as previously described, wherein the velocity data may also be used for predicting the landing point. In addition, the eye orientation/tracking data for the set of sample points is provided as an input to a recurrent neural network (e.g., deep learning engine). The neural network is trained on previously measured eye orientation data of a plurality of saccades of test subjects, for example. In one embodiment, the recurrent neural network includes a long-short-term-memory neural network, and a fully connected multilayer perceptron network. The recurrent neural network may be configured to compare a segment of an eye velocity graph built from the eye orientation data for the set of sample points against eye velocity graphs built from the plurality of saccades of test subjects. A match between the segment of the eye velocity graph of a saccade of the user may be made with a trained saccade in the recurrent neural network. Once a match is made, one or more predicted landing points of the saccade of the user may approximate the one or more landing points of the trained saccades. As such, the landing point of the saccade (e.g., end of the saccade, or an intermediate point during the saccade) may be predicted using the information from the set of sample points using the recurrent neural network.

In addition, the prediction of the landing point may be updated with subsequent predictions using different sets of sample point data. For example, in association with a first current sample point, a first landing point is predicted at 741. The prediction of the first landing point is based on eye orientation data of a first set of sample points including the first sample point and at least one previous sample point. The eye orientation data includes eye and/or gaze directions with respect to the HMD. An updated prediction is performed in association with a second current sample point following the first sample point in the saccade at 742. The updating of the landing point includes predicting a second landing point based on eye orientation data of a second set of sample points including the second sample point and at least one previous sample point (e.g., the first sample point).

At decision step 743, the method determines if there is a convergence of the predicted landing point. For example, convergence may occur when two predicted landing points are within a threshold measurement (e.g., delta distance on the display between the two predicted landing points). In one embodiment, convergence occurs when two predicted landing points are identical.

If there is no convergence, the method proceeds to 744, wherein another prediction is performed. In particular, at a next sample point following the previous sample point, the next landing point is predicted based on eye orientation/tracking data from the next sample point and at least one previous sample point. The method returns to decision step 743 to determine if there is convergence.

On the other hand, if there is convergence, the method proceeds to 745, wherein the last predicted landing point is selected as the landing point for saccade prediction. That is, because of convergence, the last calculated landing point is used as the predicted landing point.

In one embodiment, foveated rendering may be performed based on the predicted landing point. For example, a first video frame may be rendered for display, wherein the first video frame includes a foveal region centered about the predicted landing point on the display. The foveal region may be rendered at high resolution. In addition, non-foveal regions of the display include remaining portions of the display, and are rendered at a lower resolution. Further, the first video frame having the foveal region is presented on the display of the HMD, wherein the eye is predicted to be oriented towards the landing point (i.e., corresponding to the foveal region) upon displaying the first video frame.

In another embodiment, additional measures may be taken to reduce power consumption when rendering frames for display on an HMD. In particular, during a saccade, the user may not be able to view the intermediate frames that are rendered and displayed because the eye movement may be too fast. As such, the rendering of at least one of the intermediate video frame may be terminated to save the computing resources that otherwise would be used for rendering. That is, the method includes terminating rendering of at least one video frame during the saccade that is to be rendered before the first video frame.

In still another embodiment, another measure may be taken to reduce power consumption when rendering frames for display on the HMD. In particular, because the user may not be able to view the intermediate frames that are rendered and displayed during a saccade, the entire video frame may be rendered at a lower resolution, or at low resolution. That is, no foveal region is rendered for that frame. In other words, the method includes rendering at low resolution at least one video frame during the saccade that is to be rendered before the first video frame.

Figure 8:
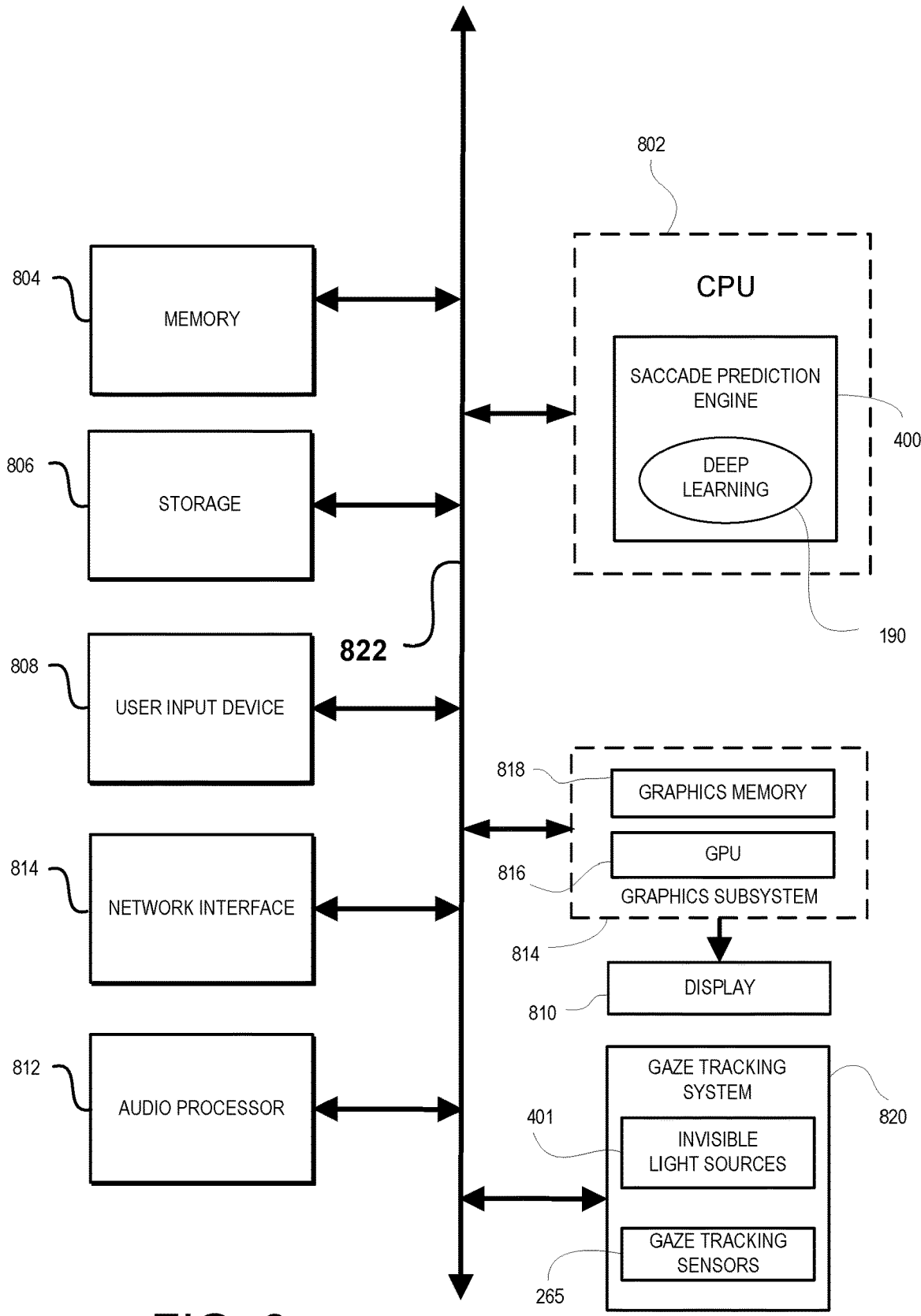
FIG. 8 illustrates components of an example device that can be used to perform aspects of the various embodiments of the present disclosure

FIG. 8 illustrates components of an example device 800 that can be used to perform aspects of the various embodiments of the present disclosure. For example, FIG. 8 illustrates an exemplary hardware system suitable for implementing a device that is configured for predicting and updating targeted landing points on a display such that movement of the eye(s) of a user coincides with the presentation of a foveal region on the display at the updated targeted landing point, in accordance with one embodiment. Example device 800 is generically described, as prediction of a landing point may be performed both within the context of an HMD, as well as more traditional displays. This block diagram illustrates a device 800 that can incorporate or can be a personal computer, video game console, personal digital assistant, or other digital device, suitable for practicing an embodiment of the disclosure. Device 800 includes a central processing unit (CPU) 802 for running software applications and optionally an operating system. CPU 802 may be comprised of one or more homogeneous or heterogeneous processing cores. For example, CPU 802 is one or more general-purpose microprocessors having one or more processing cores. Further embodiments can be implemented using one or more CPUs with microprocessor architectures specifically adapted for highly parallel and computationally intensive applications, such as media and interactive entertainment applications, or applications configured for providing prediction of a landing point on a display associated with a gaze direction of the eye(s) of a user during and/or at the end of saccade that is defined in association with the user viewing the display, as previously described.

Memory 804 stores applications and data for use by the CPU 802. Storage 806 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 808 communicate user inputs from one or more users to device 800, examples of which may include keyboards, mice, joysticks, touch pads, touch screens, still or video recorders/cameras, tracking devices for recognizing gestures, and/or microphones. Network interface 814 allows device 800 to communicate with other computer systems via an electronic communications network, and may include wired or wireless communication over local area networks and wide area networks such as the internet. An audio processor 812 is adapted to generate analog or digital audio output from instructions and/or data provided by the CPU 802, memory 804, and/or storage 806. The components of device 800, including CPU 802, memory 804, data storage 806, user input devices 808, network interface 810, and audio processor 812 are connected via one or more data buses 822

A graphics subsystem 814 is further connected with data bus 822 and the components of the device 800. The graphics subsystem 814 includes a graphics processing unit (GPU) 816 and graphics memory 818. Graphics memory 818 includes a display memory (e.g., a frame buffer) used for storing pixel data for each pixel of an output image. Graphics memory 818 can be integrated in the same device as GPU 816, connected as a separate device with GPU 816, and/or implemented within memory 804. Pixel data can be provided to graphics memory 818 directly from the CPU 802. Alternatively, CPU 802 provides the GPU 816 with data and/or instructions defining the desired output images, from which the GPU 816 generates the pixel data of one or more output images. The data and/or instructions defining the desired output images can be stored in memory 804 and/or graphics memory 818. In an embodiment, the GPU 816 includes 3D rendering capabilities for generating pixel data for output images from instructions and data defining the geometry, lighting, shading, texturing, motion, and/or camera parameters for a scene. The GPU 816 can further include one or more programmable execution units capable of executing shader programs.

The graphics subsystem 814 periodically outputs pixel data for an image from graphics memory 818 to be displayed on display device 810, or to be projected by projection system 840. Display device 810 can be any device capable of displaying visual information in response to a signal from the device 800, including CRT, LCD, plasma, and OLED displays. Device 800 can provide the display device 810 with an analog or digital signal, for example.

In addition, device 800 includes a gaze tracking system 820 that includes gaze tracking sensors 265 and light sources (e.g., emitting invisible infrared light), as previously described.

Figure 9:
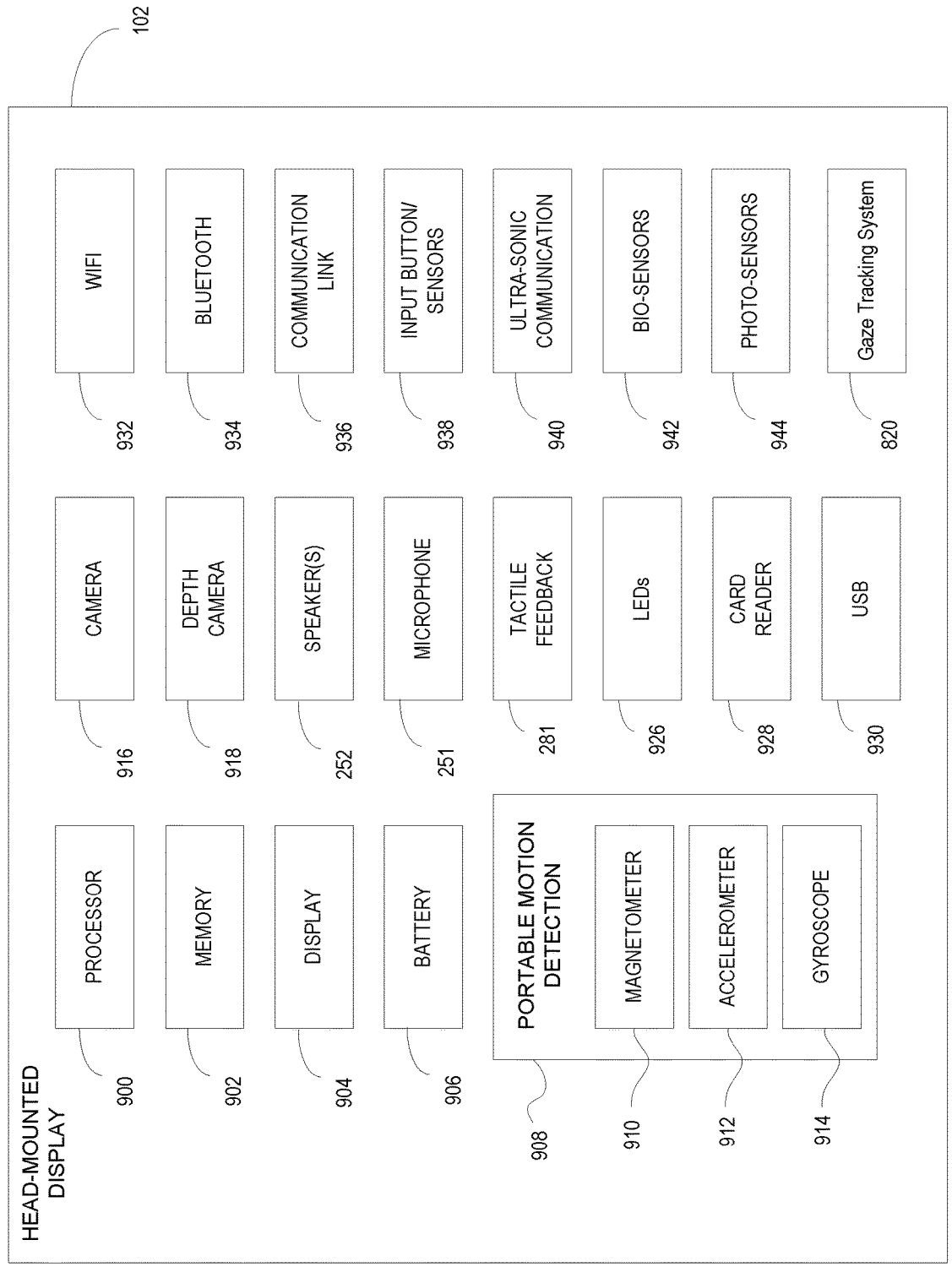
FIG. 9 is a diagram illustrating components of a head-mounted display is shown, in accordance with an embodiment of the disclosure.

It should be understood that the embodiments described herein may be executed on any type of client device. In some embodiments, the client device is a head mounted display (HMD), or projection system. FIG. 9, a diagram illustrating components of a head-mounted display 102 is shown, in accordance with an embodiment of the disclosure. The HMD 102 may be configured to predict a landing point on a display of an HMD associated with the gaze direction of the eye(s) of a user during and/or at the end of a saccade that is defined in association with the user viewing the display.

The head-mounted display 102 includes a processor 900 for executing program instructions. A memory 902 is provided for storage purposes, and may include both volatile and non-volatile memory. A display 904 is included which provides a visual interface that a user may view. A battery 906 is provided as a power source for the head-mounted display 102. A motion detection module 908 may include any of various kinds of motion sensitive hardware, such as a magnetometer 910A, an accelerometer 912, and a gyroscope 914.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 912 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 910A are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 912 is used together with magnetometer 910A to obtain the inclination and azimuth of the head-mounted display 102.

A gyroscope is a device for measuring or maintaining orientation, based on the principles of angular momentum. In one embodiment, three gyroscopes 914 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 916 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 918 may be included in the head-mounted display 102 for sensing depth information of objects in a real environment.

In one embodiment, a camera integrated on a front face of the HMD may be used to provide warnings regarding safety. For example, if the user is approaching a wall or object, the user may be warned. In one embodiment, the use may be provided with an outline view of physical objects in the room, to warn the user of their presence. The outline may, for example, be an overlay in the virtual environment. In some embodiments, the HMD user may be provided with a view to a reference marker, that is overlaid in, for example, the floor. For instance, the marker may provide the user a reference of where the center of the room is, which in which the user is playing the game. This may provide, for example, visual information to the user of where the user should move to avoid hitting a wall or other object in the room. Tactile warnings can also be provided to the user, and/or audio warnings, to provide more safety for when the user wears and plays games or navigates content with an HMD.

The head-mounted display 102 includes speakers 252 for providing audio output. Also, a microphone 251 may be included for capturing audio from the real environment, including sounds from the ambient environment, speech made by the user, etc. The head-mounted display 102 includes tactile feedback module 281 for providing tactile feedback to the user. In one embodiment, the tactile feedback module 281 is capable of causing movement and/or vibration of the head-mounted display 102 so as to provide tactile feedback to the user.

LEDs 926 are provided as visual indicators of statuses of the head-mounted display 102. For example, an LED may indicate battery level, power on, etc. A card reader 928 is provided to enable the head-mounted display 102 to read and write information to and from a memory card. A USB interface 930 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A Wi-Fi module 932 is included for enabling connection to the Internet via wireless networking technologies. Also, the head-mounted display 102 includes a Bluetooth module 934 for enabling wireless connection to other devices. A communications link 936 may also be included for connection to other devices. In one embodiment, the communications link 936 utilizes infrared transmission for wireless communication. In other embodiments, the communications link 936 may utilize any of various wireless or wired transmission protocols for communication with other devices.

Input buttons/sensors 938 are included to provide an input interface for the user. Any of various kinds of input interfaces may be included, such as buttons, touchpad, joystick, trackball, etc. An ultra-sonic communication module 940 may be included in head-mounted display 102 for facilitating communication with other devices via ultra-sonic technologies.

Bio-sensors 942 are included to enable detection of physiological data from a user. In one embodiment, the bio-sensors 942 include one or more dry electrodes for detecting bio-electric signals of the user through the user's skin.

Photo-sensors 944 are included to respond to signals from emitters (e.g., infrared base stations) placed in a 3-dimensional physical environment. The gaming console analyzes the information from the photo-sensors 944 and emitters to determine position and orientation information related to the head-mounted display 102.

In addition, gaze tracking system 820 is included and configured to enable tracking of the gaze of the user. For example, system 820 may include gaze tracking cameras (e.g., sensors) which captures images of the user's eyes, which are then analyzed to determine the gaze direction of the user. In one embodiment, information about the gaze direction of the user can be utilized to affect the video rendering and/or predict landing points on a display towards with the gaze of a user is directed during or at the end of a saccade. Also, video rendering in the direction of gaze can be prioritized or emphasized, such as by providing greater detail, higher resolution through foveated rendering, higher resolution of a particle system effect displayed in the foveal region, lower resolution of a particle system effect displayed outside the foveal region, or faster updates in the region where the user is looking.

The foregoing components of head-mounted display 102 have been described as merely exemplary components that may be included in head-mounted display 102. In various embodiments of the disclosure, the head-mounted display 102 may or may not include some of the various aforementioned components. Embodiments of the head-mounted display 102 may additionally include other components not presently described, but known in the art, for purposes of facilitating aspects of the present disclosure as herein described.

It will be appreciated by those skilled in the art that in various embodiments of the disclosure, the aforementioned head mounted device may be utilized in conjunction with an interactive application displayed on a display to provide various interactive functions. The exemplary embodiments described herein are provided by way of example only, and not by way of limitation.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A Game Processing Server (GPS) (or simply a "game server") is used by game clients to play single and multiplayer video games. Most video games played over the Internet operate via a connection to the game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices to exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by a software company that owns the game title, allowing them to control and update content.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

Figure 10:
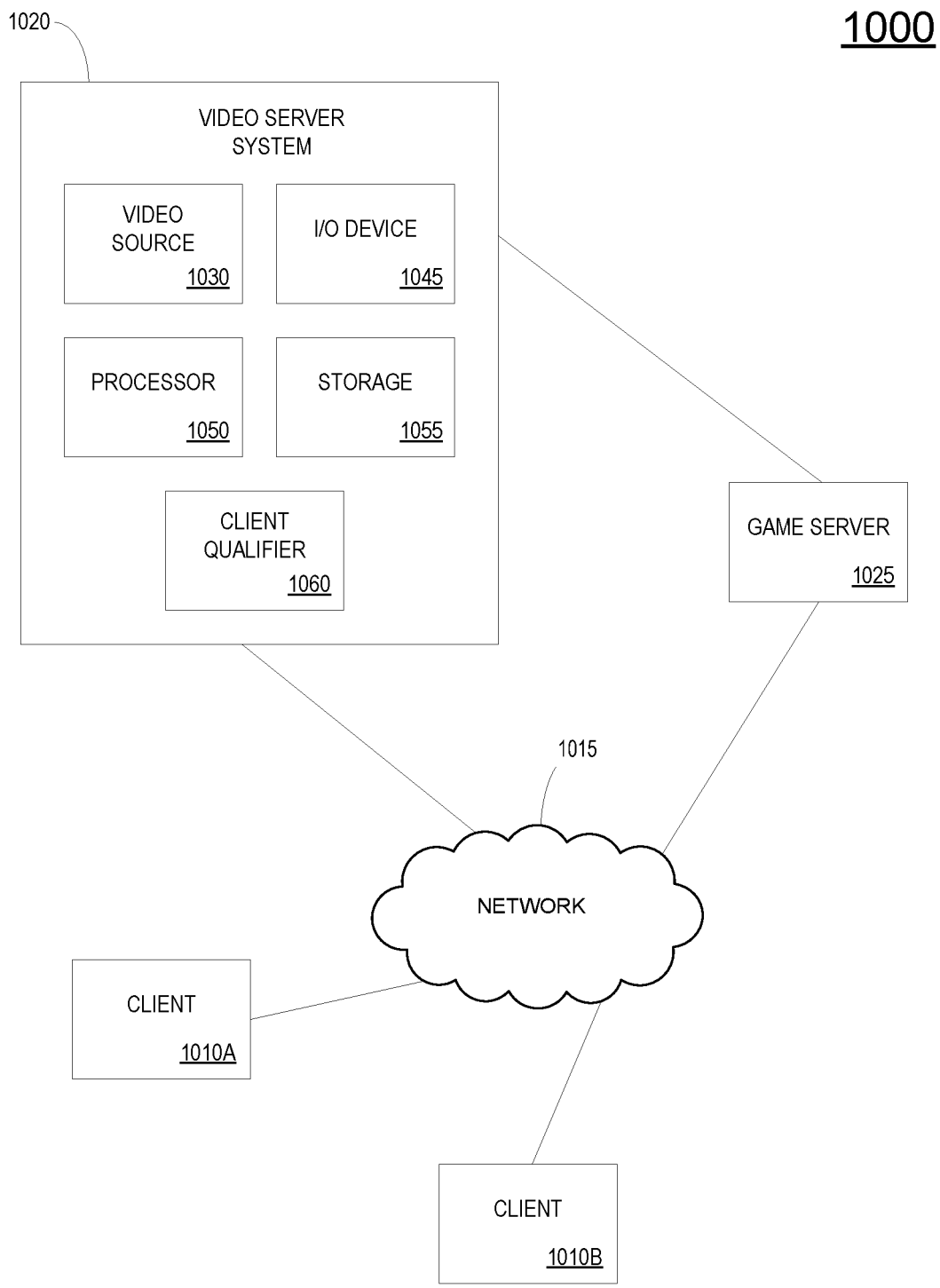
FIG. 10 is a block diagram of a Game System, according to various embodiments of the disclosure.

In particular, FIG. 10 is a block diagram of a Game System 1000, according to various embodiments of the disclosure. Game System 1000 is configured to provide a video stream to one or more Clients 1010 via a Network 1015, such as in a single-player mode or multi-player mode. Game System 1000 typically includes a Video Server System 1020 and an optional game server 1025. Video Server System 1020 is configured to provide the video stream to the one or more Clients 1010 with a minimal quality of service. For example, Video Server System 1020 may receive a game command that changes the state of or a point of view within a video game, and provide Clients 1010 with an updated video stream reflecting this change in state with minimal lag time. The Video Server System 1020 may be configured to provide the video stream in a wide variety of alternative video formats, including formats yet to be defined. Further, the video stream may include video frames configured for presentation to a user at a wide variety of frame rates. Typical frame rates are 30 frames per second, 80 frames per second, and 820 frames per second. Although higher or lower frame rates are included in alternative embodiments of the disclosure.

Clients 1010, referred to herein individually as 1010A, 1010B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1010 are configured to receive encoded video streams (i.e., compressed), decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1010 or on a separate device such as a monitor or television. Clients 1010 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1010 are optionally geographically dispersed. The number of clients included in Game System 1000 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1020 to deliver a game viewed through the HMD. In one embodiment, the game console receives the video stream from the video server system 1020, and the game console forwards the video stream, or updates to the video stream, to the HMD for rendering.

Clients 1010 are configured to receive video streams via Network 1015. Network 1015 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1010 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1010 may, but are not required to, further include systems configured for modifying received video. For example, a client may be configured to perform further rendering, to overlay one video image on another video image, to crop a video image, and/or the like. For example, Clients 1010 may be configured to receive various types of video frames, such as I-frames, P-frames and B-frames, and to process these frames into images for display to a user. In some embodiments, a member of Clients 1010 is configured to perform further rendering, shading, conversion to 3-D, or like operations on the video stream. A member of Clients 1010 is optionally configured to receive more than one audio or video stream. Input devices of Clients 1010 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1010 is generated and provided by Video Server System 1020. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1010 are typically configured to receive inputs from a user. These inputs may include game commands configured to change the state of the video game or otherwise affect gameplay. The game commands can be received using input devices and/or may be automatically generated by computing instructions executing on Clients 1010. The received game commands are communicated from Clients 1010 via Network 1015 to Video Server System 1020 and/or Game Server 1025. For example, in some embodiments, the game commands are communicated to Game Server 1025 via Video Server System 1020. In some embodiments, separate copies of the game commands are communicated from Clients 1010 to Game Server 1025 and Video Server System 1020. The communication of game commands is optionally dependent on the identity of the command Game commands are optionally communicated from Client 1010A through a different route or communication channel that that used to provide audio or video streams to Client 1010A.

Game Server 1025 is optionally operated by a different entity than Video Server System 1020. For example, Game Server 1025 may be operated by the publisher of a multi-player game. In this example, Video Server System 1020 is optionally viewed as a client by Game Server 1025 and optionally configured to appear from the point of view of Game Server 1025 to be a prior art client executing a prior art game engine. Communication between Video Server System 1020 and Game Server 1025 optionally occurs via Network 1015. As such, Game Server 1025 can be a prior art multiplayer game server that sends game state information to multiple clients, one of which is game server system 1020. Video Server System 1020 may be configured to communicate with multiple instances of Game Server 1025 at the same time. For example, Video Server System 1020 can be configured to provide a plurality of different video games to different users. Each of these different video games may be supported by a different Game Server 1025 and/or published by different entities. In some embodiments, several geographically distributed instances of Video Server System 1020 are configured to provide game video to a plurality of different users. Each of these instances of Video Server System 1020 may be in communication with the same instance of Game Server 1025. Communication between Video Server System 1020 and one or more Game Server 1025 optionally occurs via a dedicated communication channel. For example, Video Server System 1020 may be connected to Game Server 1025 via a high bandwidth channel that is dedicated to communication between these two systems.

Video Server System 1020 comprises at least a Video Source 1030, an I/O Device 1045, a Processor 1050, and non-transitory Storage 1055. Video Server System 1020 may include one computing device or be distributed among a plurality of computing devices. These computing devices are optionally connected via a communications system such as a local area network.

Video Source 1030 is configured to provide a video stream, e.g., streaming video or a series of video frames that form a moving picture. In some embodiments, Video Source 1030 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 1025. Game Server 1025 may maintain a copy of the state of the game based on game commands received from multiple players using geographically disperse clients. In these cases, the game state is provided by Game Server 1025 to Video Source 1030, wherein a copy of the game state is stored and rendering is performed. Game Server 1025 may receive game commands directly from Clients 1010 via Network 1015, and/or may receive game commands via Video Server System 1020.

Video Source 1030 typically includes rendering logic, e.g., hardware, firmware, and/or software stored on a computer readable medium such as Storage 1055. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1010. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1030 includes a video recording device such as a camera. This camera may be used to generate delayed or live video that can be included in the video stream of a computer game. The resulting video stream optionally includes both rendered images and images recorded using a still or video camera. Video Source 1030 may also include storage devices configured to store previously recorded video to be included in a video stream. Video Source 1030 may also include motion or positioning sensing devices configured to detect motion or position of an object, e.g., person, and logic configured to determine a game state or produce video-based on the detected motion and/or position.

Video Source 1030 is optionally configured to provide overlays configured to be placed on other video. For example, these overlays may include a command interface, log in instructions, messages to a game player, images of other game players, video feeds of other game players (e.g., webcam video). In embodiments of Client 1010A including a touch screen interface or a gaze detection interface, the overlay may include a virtual keyboard, joystick, touch pad, and/or the like. In one example of an overlay a player's voice is overlaid on an audio stream. Video Source 1030 optionally further includes one or more audio sources.

In embodiments wherein Video Server System 1020 is configured to maintain the game state based on input from more than one player, each player may have a different point of view comprising a position and direction of view. Video Source 1030 is optionally configured to provide a separate video stream for each player based on their point of view. Further, Video Source 1030 may be configured to provide a different frame size, frame data size, and/or encoding to each of Client 1010. Video Source 1030 is optionally configured to provide 3-D video.

I/O Device 1045 is configured for Video Server System 1020 to send and/or receive information such as video, commands, requests for information, a game state, gaze information, device motion, device location, user motion, client identities, player identities, game commands, security information, audio, and/or the like. I/O Device 1045 typically includes communication hardware such as a network card or modem. I/O Device 1045 is configured to communicate with Game Server 1025, Network 1015, and/or Clients 1010.

Processor 1050 is configured to execute logic, e.g. software, included within the various components of Video Server System 1020 discussed herein. For example, Processor 1050 may be programmed with software instructions in order to perform the functions of Video Source 1030, Game Server 1025, and/or a Client Qualifier 1060. Video Server System 1020 optionally includes more than one instance of Processor 1050. Processor 1050 may also be programmed with software instructions in order to execute commands received by Video Server System 1020, or to coordinate the operation of the various elements of Game System 1000 discussed herein. Processor 1050 may include one or more hardware device. Processor 1050 is an electronic processor.

Storage 1055 includes non-transitory analog and/or digital storage devices. For example, Storage 1055 may include an analog storage device configured to store video frames. Storage 1055 may include a computer readable digital storage, e.g., a hard drive, an optical drive, or solid state storage. Storage 1055 is configured (e.g., by way of an appropriate data structure or file system) to store video frames, artificial frames, a video stream including both video frames and artificial frames, audio frame, an audio stream, and/or the like. Storage 1055 is optionally distributed among a plurality of devices. In some embodiments, Storage 1055 is configured to store the software components of Video Source 1030 discussed elsewhere herein. These components may be stored in a format ready to be provisioned when needed.

Video Server System 1020 optionally further comprises Client Qualifier 1060. Client Qualifier 1060 is configured for remotely determining the capabilities of a client, such as Clients 1010A or 1010B. These capabilities can include both the capabilities of Client 1010A itself as well as the capabilities of one or more communication channels between Client 1010A and Video Server System 1020. For example, Client Qualifier 1060 may be configured to test a communication channel through Network 1015.

Client Qualifier 1060 can determine (e.g., discover) the capabilities of Client 1010A manually or automatically. Manual determination includes communicating with a user of Client 1010A and asking the user to provide capabilities. For example, in some embodiments, Client Qualifier 1060 is configured to display images, text, and/or the like within a browser of Client 1010A. In one embodiment, Client 1010A is an HMD that includes a browser. In another embodiment, client 1010A is a game console having a browser, which may be displayed on the HMD. The displayed objects request that the user enter information such as operating system, processor, video decoder type, type of network connection, display resolution, etc., of Client 1010A. The information entered by the user is communicated back to Client Qualifier 1060.

Automatic determination may occur, for example, by execution of an agent on Client 1010A and/or by sending test video to Client 1010A. The agent may comprise computing instructions, such as java script, embedded in a web page or installed as an add-on. The agent is optionally provided by Client Qualifier 1060. In various embodiments, the agent can find out processing power of Client 1010A, decoding and display capabilities of Client 1010A, lag time reliability and bandwidth of communication channels between Client 1010A and Video Server System 1020, a display type of Client 1010A, firewalls present on Client 1010A, hardware of Client 1010A, software executing on Client 1010A, registry entries within Client 1010A, and/or the like.

Client Qualifier 1060 includes hardware, firmware, and/or software stored on a computer readable medium. Client Qualifier 1060 is optionally disposed on a computing device separate from one or more other elements of Video Server System 1020. For example, in some embodiments, Client Qualifier 1060 is configured to determine the characteristics of communication channels between Clients 1010 and more than one instance of Video Server System 1020. In these embodiments the information discovered by Client Qualifier can be used to determine which instance of Video Server System 1020 is best suited for delivery of streaming video to one of Clients 1010.

While specific embodiments have been provided to demonstrate the predicting and updating of targeted landing points on a display such that movement of the eye(s) of a user coincides with the presentation of a foveal region on the display at the updated targeted landing point, these are described by way of example and not by way of limitation. Those skilled in the art having read the present disclosure will realize additional embodiments falling within the spirit and scope of the present disclosure.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method for predicting eye movement in a head mounted display (HMD), comprising:

tracking movement of an eye of a user with a gaze tracking system disposed in the HMD at a plurality of sample points;

determining velocity of the movement based on the tracking;

determining that the eye of the user is in a saccade upon the velocity reaching a threshold velocity; and predicting a landing point on a display of the HMD corresponding to a direction of the eye for the saccade;

rendering for display a first video frame having a foveal region centered about the landing point on the display; and presenting the first video frame having the foveal region on the display of the HMD, wherein the eye is predicted to be oriented towards the landing point upon displaying the first video frame.

2. The method of claim 1, further comprising:

terminating rendering of at least one video frame during the saccade that is to be rendered before the first video frame.

3. The method of claim 1, further comprising:

rendering at low resolution at least one video frame during the saccade that is to be rendered before the first video frame.

4. The method of claim 1, wherein the predicting the landing point includes:

at a first sample point, predicting a first landing point based on first eye orientation data of a first set of sample points including the first sample point and at least one previous sample point, wherein the first eye orientation data includes a plurality of directions of the eys with respect to the HMD; and at a second sample point following the first sample point in the saccade, updating the landing point by predicting a second landing point based on second eye orientation data of a second set of sample points including the second sample point and at least one previous sample point.

5. The method of claim 1, wherein the predicting the landing point includes:

collecting first eye orientation data when tracking the movement of the eye for a set of sample points, the first eye orientation data including a plurality of directions of the eye with respect to the HMD, wherein at least one sample point of the set of sample points occurs during the saccade;

providing as input the first eye orientation data for the set of sample points to a recurrent neural network trained on second eye orientation data of a plurality of saccades of test subjects;

comparing in the recurrent neural network a segment of an eye velocity graph built from the first eye orientation data for the set of sample points against a plurality of eye velocity graphs built from the plurality of saccades of test subjects; and determining in the recurrent neural network the landing point.

6. The method of claim 5, wherein the landing point occurs at an end of the saccade and corresponds to a fixation direction of the eye.

7. The method of claim 5, wherein the landing point occurs at a mid-point of the saccade and corresponds to an intermediate direction of the eye.

8. The method of claim 5, wherein the recurrent neural network includes at least one of:

a long-short-term-memory neural network; and a fully connected multilayer perceptron network.

9. The method of claim 1, wherein the determining velocity of the movement includes:

determining a velocity of the eye based on a first eye direction and a second eye direction from two sample points.

10. A computer system comprising:

a processor; and memory coupled to the processor and having stored therein instructions that, if executed by the computer system, cause the computer system to execute a method for predicting eye movement in a head mounted display (HMD) comprising:

tracking movement of an eye of a user with a gaze tracking system disposed in the HMD at a plurality of sample points;

determining velocity of the movement based on the tracking;

determining that the eye of the user is in a saccade upon the velocity reaching a threshold velocity; and predicting a landing point on a display of the HMD corresponding to a direction of the eye for the saccade;

rendering for display a first video frame having a foveal region centered about the landing point on the display; and presenting the first video frame having the foveal region on the display of the HMD, wherein the eye is predicted to be oriented towards the landing point upon displaying the first video frame.

11. The computer system of claim 10, the method further comprising:

terminating rendering of at least one video frame during the saccade that is to be rendered before the first video frame.

12. The computer system of claim 10, the method further comprising:

rendering at low resolution at least one video frame during the saccade that is to be rendered before the first video frame.

13. The computer system of claim 10, wherein in the method the predicting the landing point includes:

at a first sample point, predicting a first landing point based on first eye orientation data of a first set of sample points including the first sample point and at least one previous sample point, wherein the first eye orientation data includes a plurality of directions of the eye with respect to the HMD; and at a second sample point following the first sample point in the saccade, updating the landing point by predicting a second landing point based on second eye orientation data of a second set of sample points including the second sample point and at least one previous sample point.

14. The computer system of claim 10, wherein in the method the predicting the landing point includes:

collecting first eye orientation data when tracking the movement of the eye for a set of sample points, the first eye orientation data including a plurality of directions of the eye with respect to the HMD, wherein at least one sample point of the set of sample points occurs during the saccade;

providing as input the first eye orientation data for the set of sample points to a recurrent neural network trained on second eye orientation data of a plurality of saccades of test subjects;

comparing in the recurrent neural network a segment of an eye velocity graph built from the first eye orientation data for the set of sample points against a plurality of eye velocity graphs built from the plurality of saccades of test subjects; and determining in the recurrent neural network the landing point.

15. The computer system of claim 14, wherein in the method the landing point occurs at an end of the saccade and corresponds to a fixation direction of the eye.

16. The computer system of claim 14, wherein in the method the recurrent neural network includes at least one of:
a long-short-term-memory neural network; and
a fully connected multilayer perceptron network.

17. A non-transitory computer-readable medium storing a computer program for prediction, the computer-readable medium comprising:
program instructions for tracking movement of an eye of a user with a gaze tracking system disposed in a head mounted display (HMD) at a plurality of sample points;
program instructions for determining velocity of the movement based on the tracking;
program instructions for determining that the eye of the user is in a saccade upon the velocity reaching a threshold velocity; and
program instructions for predicting a landing point on a display of the HMD corresponding to a direction of the eye for the saccade;
program instructions for rendering for display a first video frame having a foveal region centered about the landing point on the display; and
program instructions for presenting the first video frame having the foveal region on the display of the HMD, wherein the eye is predicted to be oriented towards the landing point upon displaying the first video frame.

18. The computer-readable medium of claim 17, further comprising:
terminating rendering of at least one video frame during the saccade that is to be rendered before the first video frame.

19. The computer-readable medium of claim 17, further comprising:
rendering at low resolution at least one video frame during the saccade that is to be rendered before the first video frame.

20. The computer-readable medium of claim 17, wherein the predicting the landing point includes:
at a first sample point, predicting a first landing point based on first eye orientation data of a first set of sample points including the first sample point and at least one previous sample point, wherein the first eye orientation data includes a plurality of directions of the eye with respect to the HMD; and
at a second sample point following the first sample point in the saccade, updating the landing point by predicting a second landing point based on second eye orientation data of a second set of sample points including the second sample point and at least one previous sample point.

21. The computer-readable medium of claim 17, wherein the predicting the landing point includes:
collecting first eye orientation data when tracking the movement of the eye for a set of sample points, the first eye orientation data including a plurality of directions of the eye with respect to the HMD, wherein at least one sample point of the set of sample points occurs during the saccade;
providing as input the first eye orientation data for the set of sample points to a recurrent neural network trained on second eye orientation data of a plurality of saccades of test subjects;
comparing in the recurrent neural network a segment of an eye velocity graph built from the first eye orientation data for the set of sample points against a plurality of eye velocity graphs built from the plurality of saccades of test subjects; and
determining in the recurrent neural network the landing point.

22. The computer-readable medium of claim 21, wherein the landing point occurs at an end of the saccade and corresponds to a fixation direction of the eye.

23. The computer-readable medium of claim 21, wherein the recurrent neural network comprises:
a long-short-term-memory neural network; and
a fully connected multilayer perceptron network.

24. A method for predicting eye movement in a head mounted display (HMD), comprising:
tracking movement of an eye of a user with a gaze tracking system disposed in the HMD at a plurality of sample points;
determining velocity of the movement based on the tracking;
determining that the eye of the user is in a saccade upon the velocity reaching a threshold velocity;
predicting a landing point on a display of the HMD corresponding to a direction of the eye for the saccade, wherein the predicting the landing point includes:
at a first sample point, predicting a first landing point based on first eye orientation data of a first set of sample points including the first sample point and at least one previous sample point, wherein the first eye orientation data includes a plurality of directions of the eye with respect to the HMD; and
at a second sample point following the first sample point in the saccade, updating the landing point by predicting a second landing point based on second eye orientation data of a second set of sample points including the second sample point and at least one previous sample point.

25. The method of claim 24, further comprising:
terminating rendering of at least one video frame during the saccade that is to be rendered before a first video frame having a foveal region centered about the landing point on the display.

26. The method of claim 24, further comprising:
rendering at low resolution at least one video frame during the saccade that is to be rendered before a first video frame having a foveal region centered about the landing point on the display.

27. A method for predicting eye movement in a head mounted display (HMD), comprising:
tracking movement of an eye of a user with a gaze tracking system disposed in the HMD at a plurality of sample points;
determining velocity of the movement based on the tracking;
determining that the eye of the user is in a saccade upon the velocity reaching a threshold velocity; and
predicting a landing point on a display of the HMD corresponding to a direction of the eye for the saccade, wherein the predicting the landing point includes:
collecting first eye orientation data when tracking the movement of the eye for a set of sample points, the first eye orientation data including a plurality of directions of the eye with respect to the HMD, wherein at least one sample point of the set of sample points occurs during the saccade;

providing as input the first eye orientation data for the set of sample points to a recurrent neural network trained on second eye orientation data of a plurality of saccades of test subjects;

comparing in the recurrent neural network a segment of an eye velocity graph built from the first eye orientation data for the set of sample points against a plurality of eye velocity graphs built from the plurality of saccades of test subjects; and determining in the recurrent neural network the landing point.

28. The method of claim 27, further comprising:
terminating rendering of at least one video frame during the saccade that is to be rendered before a first video frame having a foveal region centered about the landing point on the display.

29. The method of claim 27, further comprising:
rendering at low resolution at least one video frame during the saccade that is to be rendered before the first video frame having a foveal region centered about the landing point on the display.

30. The method of claim 27, wherein the landing point occurs at an end of the saccade and corresponds to a fixation direction of the eye.

31. The method of claim 27, wherein the landing point occurs at a mid-point of the saccade and corresponds to an intermediate direction of the eye.

* * * * *